United States Patent
Humphrey

(10) Patent No.: US 12,339,899 B2
(45) Date of Patent: Jun. 24, 2025

(54) CONTENT GENERATION SYSTEMS AND APPLICATIONS USING OCTREE-BASED SPATIAL DATABASES

(71) Applicant: Nvidia Corporation, Santa Clara, CA (US)

(72) Inventor: Dominic Robert Humphrey, Redmond, WA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 18/323,767

(22) Filed: May 25, 2023

(65) Prior Publication Data

US 2024/0394300 A1    Nov. 28, 2024

(51) Int. Cl.
*G06F 16/583* (2019.01)
*G06F 16/51* (2019.01)

(52) U.S. Cl.
CPC .......... *G06F 16/5854* (2019.01); *G06F 16/51* (2019.01)

(58) Field of Classification Search
None
See application file for complete search history.

(56) References Cited

U.S. PATENT DOCUMENTS

| | | | | |
|---|---|---|---|---|
| 6,088,035 A * | 7/2000 | Sudarsky | ............... | G06T 15/10 345/422 |
| 6,243,097 B1 * | 6/2001 | Brokenshire | ........... | G06T 15/40 345/421 |
| 8,593,459 B2 * | 11/2013 | Mejdrich | .............. | G06T 17/005 345/426 |
| 12,067,684 B2 * | 8/2024 | Enthed | .................... | G06F 30/12 |
| 2011/0285710 A1 * | 11/2011 | Mejdrich | ................ | G06T 15/06 345/426 |
| 2013/0113800 A1 * | 5/2013 | McCombe | ............. | G06T 15/06 345/424 |
| 2017/0277727 A1 * | 9/2017 | Chen | ..................... | G06F 16/215 |
| 2018/0300939 A1 * | 10/2018 | Benthin | .................. | G06T 15/06 |
| 2021/0118230 A1 * | 4/2021 | Eder | ..................... | G06T 19/003 |
| 2023/0410426 A1 * | 12/2023 | Kangasluoma | ....... | G06T 17/005 |

* cited by examiner

*Primary Examiner* — Christopher J Raab
(74) *Attorney, Agent, or Firm* — Hogan Lovells US LLP

(57) ABSTRACT

Approaches presented herein provide for the generation and maintenance of a minimally-sized octree (or other spatial representation) for an arbitrary or dynamic dataset. An octree representation allows for efficient real-time querying of dynamic content, where such a spatial database can scale from a single machine to multiple machines. Objects in a scene can be stored to the spatial database using a set of spatial primitives. When a first object (or set of objects) in a scene is determined, an initial octree and root can be determined based at least in part upon the size and location of the object(s). An additional object may be added that is outside the existing root of the octree. A new bounding volume is generated that surrounds this new object, and the bounding volume is grown in alternating directions until the bounding volume also includes the other objects in the environment, and this new volume boundary becomes the new root of an updated octree for this environment.

20 Claims, 17 Drawing Sheets

CONTENT GENERATION SYSTEMS AND APPLICATIONS USING OCTREE-BASED SPATIAL DATABASES

BACKGROUND

In various applications—such as for data search or three-dimensional content generation, for example—it can be beneficial, if not necessary, to store data in a way that is organized across multiple dimensions. A data store such as a spatial database can be used to store such data, including dynamic publicly-available content that is to be stored at any scale. A spatial database can allow for specific operations to be performed, such as may relate to the processing of efficient, real-time queries from a large number of requestors. In order to provide for such operations, a spatial database needs the ability to scale from a single machine up to hyperscale sized environments. Certain data structures, such as octrees, are better suited for tasks such as storing point cloud data, while volumetric data such as geometric primitives may be generally better suited for storage in a bounding volume hierarchy (BVH) that is suitable for operations such as ray tracing. Ultimately, however, the resize operations needed as primitives move, scale, or perform any other update to their extents can result in performance issues that rule out a BVH as an optimal choice to store such data. Even if a structure is found to be suitable for a particular application, however, the approaches to managing growth of the space in which the data is stored will often result in much larger bounded spaces than are necessary for the relevant data, resulting in various inefficiencies in computation and other resource usage.

BRIEF DESCRIPTION OF THE DRAWINGS

Various embodiments in accordance with the present disclosure will be described with reference to the drawings, in which.

DETAILED DESCRIPTION

Figure 1A:
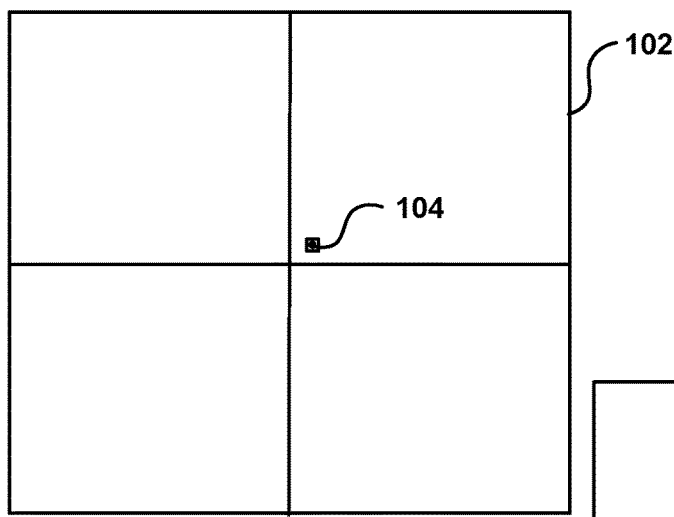
FIGS. 1A-1D illustrate example spatial representations of object primitives in a virtual environment that can be used, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, generative AI, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations using one or more language models, systems for performing light transport simulation, systems for performing collaborative content creation for 3D assets, systems implemented at least partially using cloud computing resources, and/or other types of systems.

Approaches in accordance with various illustrative embodiments provide for the generation and maintenance of a minimally-sized octree (or other spatial representation) for an arbitrary and/or dynamic dataset, such as may be useful for rendering a portion of a potentially large scene corresponding to a view of a virtual camera. An octree (or similar) representation of a spatial database allows for efficient real-time querying of dynamic content, where that spatial database can scale from a single machine to multiple machines (e.g., virtual machines (VMs)). Objects in a scene can be stored to the spatial database using physical/spatial primitives that have a volume, such that there may only be a maximum number of primitives in any given octant. When a first object (or set of objects) in a scene is determined, an initial octree and root can be determined based at least in part upon the size and location of the object(s) (e.g., max and min coordinates), which may be offset from a world space origin. That offset may be stored such that different portions of the scene assigned to different VMs (and thus different octrees) can be correlated in world space. In an editor, for example, a user may add another object into the scene. If that object is outside the existing root of the octree, a new bounding volume (e.g., bounding cube) is generated that surrounds that object (such as by determining the size of the object and scaling up by a scaling factor, such as a factor of 8). The bounding volume for the new object can be grown in alternating directions (e.g., positive and negative directions) until the bounding volume for this new object encompasses the bounding volume for the previously-existing object(s), and this new bounding volume becomes the new root of an updated octree for this VM and portion of world space, with the offset to the origin updated accordingly. Such an approach effectively stitches together two spatial trees, arriving at the minimum size octree for the objects in this region of world space. When an object is deleted from world space, a reverse process can be performed whereby bounding cubes are removed (starting from the root) that have only one child node and no primitives until a bounding volume is identified that becomes the new root and the minimum octree representation for the remaining object(s). An algorithm in accordance with at least one embodiment can reliably determine a bounded volume that encompasses any space, any two servers will compute the exact same bounding box given the same object, and any leaf or internal tree node will always match the same node volume on another server given any point within that contained region of space and at that level of the tree regardless of how the servers may need to grow and without any communication between them. Such an approach ensures there will not be any conflicts that need to be resolved. Such an approach allows for cross-server computation in a distributed environment, which can help to avoid inefficient tasks or operations such as rebasing coordinates in an environment.

Variations of this and other such functionality can be used as well within the scope of the various embodiments as would be apparent to one of ordinary skill in the art in light of the teachings and suggestions contained herein.

In at least one embodiment, a spatial database can be designed to store data using a hierarchical structure such as an octree. In such a structure, values for the various points may often be stored at the leaf nodes. In at least some embodiments—as when storing data for a complex multi-dimensional scene—primitives can be stored not only at leaf nodes, but a given primitive can be stored in a node whose size is a ratio of a combination of the maximum axis of the bounding volume and the speed of the primitive (as well as potentially any other factor that can affect the size of the primitive). In at least some embodiments, large and/or fast primitives will be stored to larger nodes in the tree, with smaller and/or slower primitives being stored to smaller nodes in the tree. When implementing an octree-type design in many existing systems used for static spaces, the extent of the world will be known up front. Knowing the extent of the world allows an appropriate bounding region—such as a bounding box, cube, or sphere for two or three dimensions—to be defined that encompasses those points without excess portions of that space being included. This bounding region can then be subdivided safely from there, with information being stored in the leaf nodes of the octree (or other tree or hierarchical structure). In such situations, nodes of the structure can be computed simply by multiplying or dividing numbers by a value such as 2. Any node in this bounded space can then be calculatable relative to the known parent in the tree structure by subdividing down from there.

In an example use case, object primitives may be stored to a spatial database that correspond to objects in a multi-dimensional environment, such as a three-dimensional (3D) environment, that are to be used to render a view of a scene occurring in that environment. The view can be rendered based in part on the viewpoint and parameters of a virtual camera. In order to perform the rendering of the view, an example process can query the scene in order to determine information about the objects located in the scene. Such an approach can help to determine which objects intersect with cast rays, for example, and therefore determine the color of a pixel in an image to be rendered. For large environments, there may be many objects that may be represented in a given view or scene. These objects may be tracked using object primitives, which can have stored information such as an object type and identifier at each of a number of locations in the environment. Tracking all these object primitives for a large environment is not always practical, particularly when only a relatively small subset of those primitives will be included in the view and thus impact the image to be rendered. While an approach to reducing the amount of resources required for such a rendering would be to filter out anything that is not within a current camera frustum, and thus would not significantly impact the final image to be rendered, such an approach is slow and computationally expensive itself. A better approach in at least some embodiments is to store the data in a spatial database that uses some type of hierarchical, logarithmic, or tree structure that can be used to quickly identify or select only a relevant portion of the environment against which testing or processing is to be performed. As mentioned, there are various data structures that can be used for such purposes, including octrees and kd-trees, among others, but these structures each have strengths and weaknesses, and perform differently with respect to different use cases.

Figure 1B:
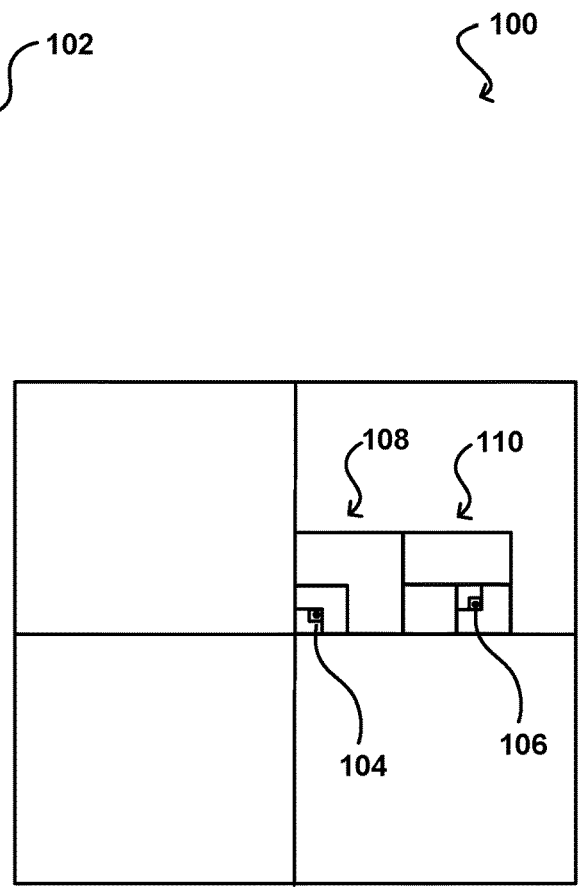
Figure 1C:
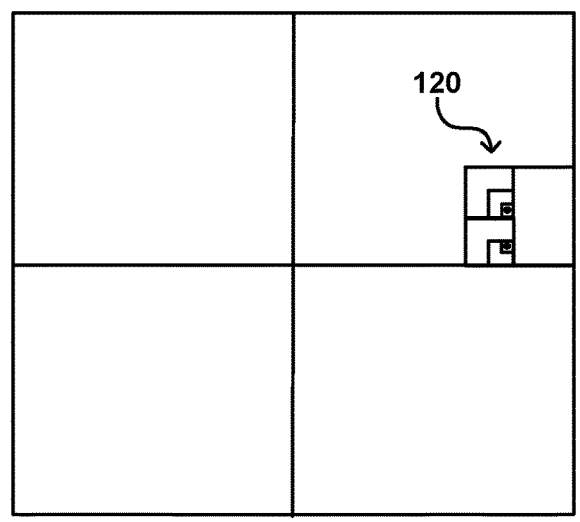

In at least one embodiment, data can be treated as points rather than volumes. This can correspond to the use of primitives to represent geometric objects in a multi-dimensional environment. These points can be stored to nodes of a hierarchical tree structure, such as an octree, among other spatial representations. For applications where the bounds of the multidimensional environment are known, such as may be confined to a bounded volume of a determined or maximum size, the space can be subdivided into an octree that should be appropriate for all future data since the size of the environment will not change. Such an approach will not, however, work in a dynamic environment where objects can be added over time and are not constrained to being placed in a given volume or distance from a local origin. As the number of objects in an environment grows, which may also correspond to growth in the size of the environment or space, the tree structure needs to be able to grow as well. Often people build an octree starting from the origin and growing out from there using only a single octant of Euclidian coordinate space 100, as illustrated in the views of FIGS. 1A-1C. In FIG. 1A, there is a single point 104 in this quadrant that can have a bounding box defined in an example environment 102. If a second point 106 is added as illustrated in FIG. 1B, that point will be in the same quadrant and bounding boxes 108, 110 can be determined around those points 104, 106 that correspond to the octant defined for that positive Euclidian octant. As illustrated in FIG. 1C, different points can result in different bounding boxes 120 being determined, but these boxes will still correspond to nodes of the same octree, with the respective points being located in leaf nodes of the tree structure.

Figure 1D:
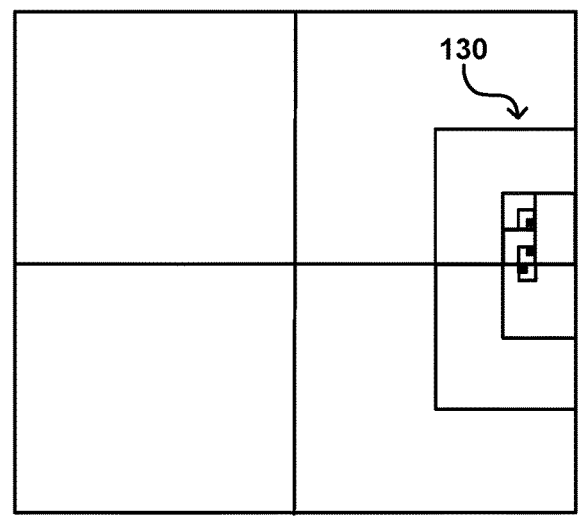

It may be the case, however that one or more points are to be located in a different Euclidian octant, as illustrated in FIG. 1D. Since there is no bounded volume that pre-exists that encompasses all the points in the different octants, there may be a need to create a global bounding box in some approaches that encompass all these octants, but as discussed herein that can be inefficient. Another approach would be to reorient or shift the origin such that everything is still in a positive octant, but shifting origins and rebuilding trees is also computationally expensive. Another approach is to use eight octrees—one octree for each octant in Euclidian space—and stitch them together to form a single tree under one overall bounding box as a root node of the tree. Such an approach can result in a set of bounding boxes 130 that encompass points in different octants, but where no given bounding box extends across two or more octants. This process may be used beneficially when the environment is of a fixed or maximum size, but may not be particularly scalable with a dynamic space. Further, if one of the octants contains many objects and is quite large in size and a single object is placed in another octant, there is an inefficiency in that there will need to be a very large overall box with eight child octrees that are each at the size of the largest octant. Having to perform a task such as a log(n) search down through this large, stitched together octree can be very inefficient.

For dynamic spaces, the full extent of the world or space will often not be known up front, as points may be added—or values defined—that may extend beyond those of the previously-occupied space(s). One approach is to trivially subdivide each octant of space from the universal origin, then wrap each of those trees in a single root. Such an approach does not, however, result in a minimal root, and thus increases an overall cost of traversal. Such an approach also does not result in a node that would be desirable to keep if the tree has to be reduced in size, or even if the tree is to be grown in at least some instances. As it is often desirable to be able to store information in any node, this special case could be skipped, or data could be copied from this node to the child of a new node whenever the root is grown or shrunk by the tree. This method can also cause an increase in network traffic and data synchronization delays.

In at least one embodiment, an alternative approach can be taken that can address or avoid at least some of these issues with respect to prior approaches. As an example, bounding volumes, such as bounding boxes or cubes, can be grown in alternating directions, instead of only in a single direction. In some embodiments, bounding boxes may be grown in multiple directions in a multi-dimensional space, where the growth may occur in a specific order of directions or according to a growth algorithm, among other such options. An example set of bounding regions 200 generated using such an approach is illustrated in FIGS. 2A-2D. In this example, a three-dimensional space 202 can include a first point 204 and a second point 206 positioned relative to a selected origin point 212 and coordinate system including at least two axes. In this example, the second point 206 may have previously been present in the space, or may be added to the space 202, among other such options. A tree modification algorithm (or bounding box generation algorithm, among other such options) can attempt to add bounding regions that will eventually encompass both points, while attempting to minimize the size of a bounding box that includes both points so that the space to be traversed (and thus the corresponding compute cost) will be minimized, or at least reduced with respect to that needed for a larger bounding box. As mentioned, other types of bounding volumes or shapes can be used as well—such as cubes, spheres, or other shapes that may be regular or irregular in nature—and bounding boxes are presented as an example herein primarily based on the two-dimensional nature of the example figures.

Figure 2A:
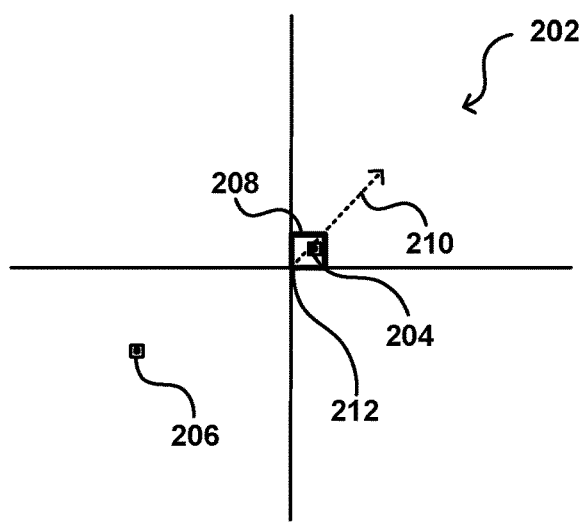
FIGS. 2A-2D illustrate iterations of an example approach to building a spatial representation to include multiple object primitives, in accordance with various embodiments.
Figure 2B:
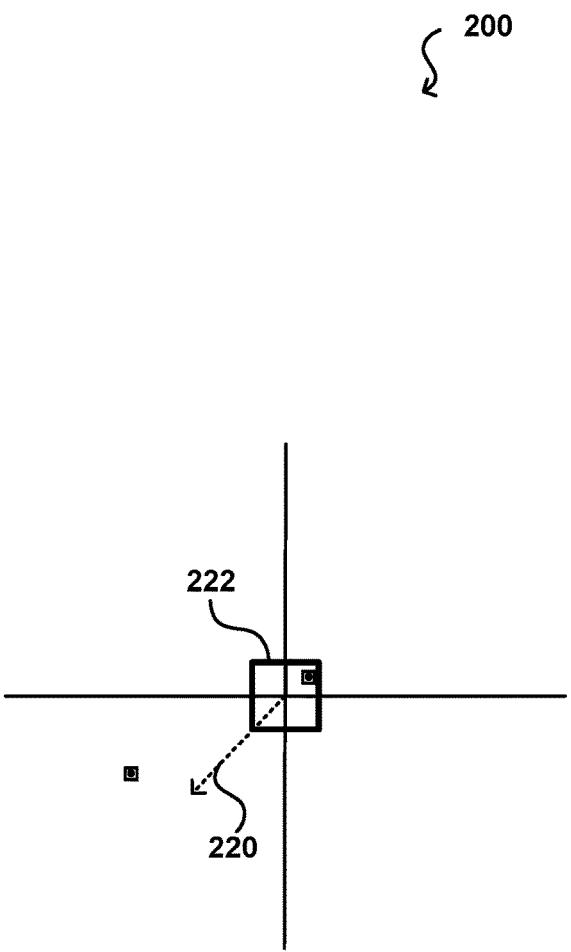
Figure 2C:
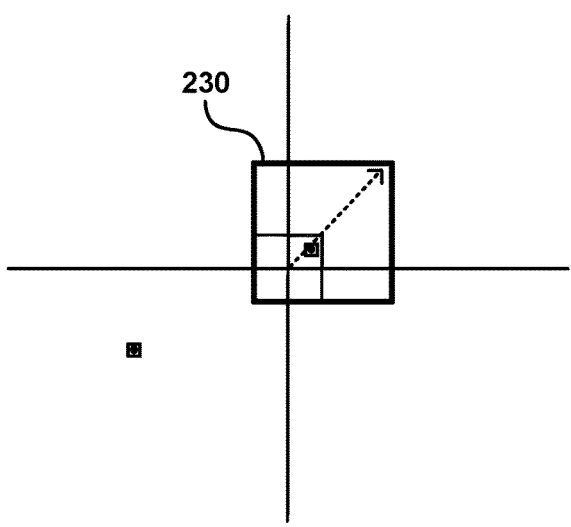
Figure 2D:
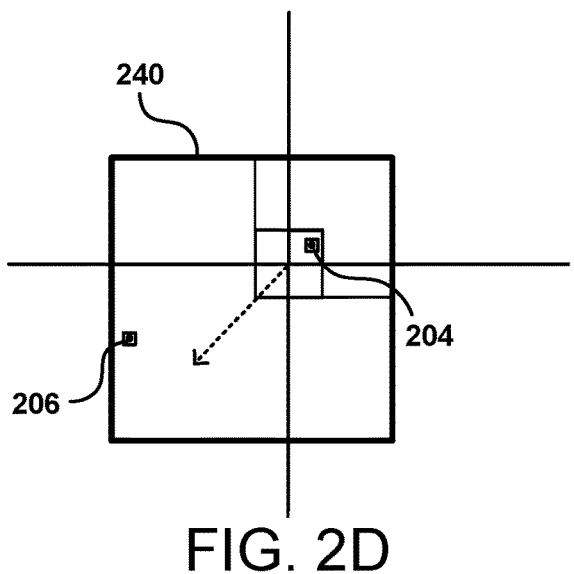

In FIG. 2A, it is illustrated that an initial bounding box 208 is generated to bound a first region, where the bounding box 208 is grown from the origin point 212 and includes the first point 204. This growth is in a first direction 210 with respect to the origin point 212. In this example, the initial bounding box 208 will be said to have sides of length 1, such that the bound region is given by [0,1). This will be considered a unit length for growth of the tree in this example, and could correspond to any appropriate coordinate values in the coordinate system. Instead of next growing again in the first direction 210, the next step is to grow the region in a second direction 220 as illustrated in FIG. 2B. The box will be of the size of the next level in the tree, which in this example results in a bounded space 222 of [−1, 1). As illustrated in FIG. 2C, a next growth step can alternate again to the first direction 210, to generate a bounded region 230 of [−1, 3). A next growth step can alternate back in the second direction 220 as illustrated in FIG. 2D, which result in a bound region 240 given by [−5, 3). In this particular example, the bound region 240 incorporates both the original point 204 and the second point 206, and is illustrated to not extend far beyond the second point. Such an approach allows the bound volume to expand dynamically in such a way as to avoid overly extending the bound space beyond the locations of the actual points to be bound. Such an approach can continue if there are additional points to be included, such as where a next growth step would alternate back to the first direction to arrive at a bound volume given by [−5, 11), and so on. By growing the bounding space in such alternating directions from any point in space, neighboring points will not encounter the crossing-a-power-of-two world-boundary-style octree issue experienced by prior approaches that attempt to grow in only a single direction or subdivide a fixed region. If a third point were to be added to this environment, this process would start again with a new bounded volume for this third point. In one or more embodiments, the bounded volume would expand in alternating directions until all points are bound by this new bounded volume, and the corresponding data and nodes generated during the process stored to the spatial database (e.g., octree).

A formula can be used to assist with such approaches to growth, which can then be implemented by a system, service, or operation as appropriate. In at least one embodiment, it can be considered that the formula should be able to make a node of a specific size anywhere in a given multi-dimensional space. This may be with respect to a given point in space—such as the center of an axis-aligned bounding box (AABB) of the primitive—and the axis length of the node to be created, which can be computed by knowing the node into which this primitive will be inserted. As this algorithm can be distributed to all systems, services, or operations, the same resulting bounding space will be generated anywhere it is computed, removing the need to share or synchronize that resulting data over the network. An AABB tree structure can be used to perform efficient intersection and distance queries against sets of primitive objects, for example, where the primitive objects stored in the AABB data structure can be queried for data such as intersection detection, intersection computation, and distance, among other such options. An AABB tree data structure can receive as input an iterator range of geometric data, which can be into a set of primitives. A hierarchy of axis-aligned bounding boxes can be constructed from these primitives. The hierarchy can be used to increase the speed of performing operations such as those that relate to intersection and distance queries. A given primitive can provide access to an input geometric object and a reference identifier for the object. In at least one embodiment, the size can correspond to a multiplier such as eight times the size of the largest axis of the AABB of the primitive. This length can be denoted as the "node_size," being the axis length of the desired spatial database node AABB cube. Using this node_size, space can be inverse-scaled by this value. The nodes in this space can then correspond to the unit values. The point can be transformed into this space by, for example, rounding down to the nearest integer then transforming back. This process can produce a minimum point in the original space of the node that contains this point. In at least one embodiment, scaling can be trivial as the value is given, while determining a corresponding shift may not be trivial. In the original space, the empirical values by which to perform a shift are as given above. The minimum coordinates from these ranges, when expanded, can produce a sequence such as may be given by:

..., 0.3125, 0.25, 0.25, 0, 0, −1, −1, −5, −5, −21, −21, −85, −85, −341, ...

(shown values for exponents from −4 to 9)

It can be seen that the value grows every second number, and that the increment grows by four when that occurs. Such an approach follows logically, as the size is being doubled each time but this only impacts the minimum point for every second iteration. This this example, "node_size" can then be given by $2^{axis\_length\_exponent}$. Such a convention can be selected to always use integers for the exponent. The alternating property of $-1^{axis\_length\_exponent}$ can then be used. There are various ways of representing this sequence, but one example is to use $3x-(-1)^{axis\_length\_exponent}x$, which produces either 2x or 4x, where x is the axis length of the node AABB size, divided by 6, as a factor of three given the above, and a factor of two corresponding to half the value. The subtraction of a third can help to produce integer values, and this can be folded into the formula inside the divide-by-six as a −2.

Given any primitive value, the precise octree node to be used to store that primitive value can be computed using such an approach. The parent nodes can also be computed as needed to stitch this new node into the existing tree, if such a tree exists. Any point inside the child node, as may include the minimum point) with a doubled axis_length_exponent will provide the parent AABB value.

Such approaches allow a spatial database, being exposed to dynamic content at any scale, to be able to store data from atoms to solar systems in a way that allows for efficient real-time queries from a variety of different actors. Everything in a scene for which the data is stored can be editable by users or code to perform tasks such as creating, deleting, moving, scaling, or rotating content items, among other such options. Such a database allows optimized spatial queries against a dynamic scene both in size and content. Use cases include small scene queries, as may relate to gathering results for omnigraph nodes collecting primitives near another primitive, aiding in reducing what needs to be loaded for large scene management on a local machine. Use cases can also include hyperscale scene queries so distributed compute nodes can each efficiently gather the data they need for simulation and boundary resolution.

As mentioned, such a database can be stored using a hierarchical tree structure, for example, such as an octree. Primitives in the scene need not be stored only at leaf nodes, but in a node whose size is a determined ratio of a combination of the maximum axis of the bounding volume and the speed of the primitive, as well as other factors that can affect the size of the primitive). In at least one embodiment, a ratio can be used that corresponds to an 8:1 node-to-prim size. In at least one embodiment, a goal of inserting primitives into notably larger nodes in the tree is to minimize (or at least reduce or avoid excess) processing and network cost. In one example there can be an attempt, for a camera in a scene to be rendered, to maintain a list of all primitives in the view of the camera. For use cases such as video game generation, there may be a number of different primitive object types that may be created and placed within a given environment. Primitives may be added to a scene as placeholders for specific objects or assets in, or to be placed in, a given scene. As these primitive objects, or primitives, move within the multi-dimensional environment, the rendering application needs to ensure that it has everything it needs to render correctly given the current location and orientation of the virtual camera from which a view is to be rendered. If a primitive moves by only a small distance, or changes its orientation by only a small amount, then a processing component—as may correspond to a virtual machine—may not want to spend computing resources to perform scene management as nothing significant has changed in the scene, at least from the perspective of the virtual camera. In at least one embodiment, the spatial database can subscribe to receive only those values that are determined affect the AABB of the primitive. An AABB_primitive parameter can be used to describe the requirements for primitives stored in an AABB tree structure. The parameter can be used to specify a type of the primitive object, as well as an identifier type for the primitive object. As an example, an AABB_primitive value can wrap a triangle as an object type and an iterator in a list as an identifier. The spatial database can update this tree as appropriate during simulation, for example, flagging nodes in the tree where the primitives contained therein have changed. If a primitive only moves within the bounds of a database node, then no further work needs to be done. A node can be flagged as dirty, or in need of updating, only if a primitive moves to a different node in at least one embodiment.

As mentioned, various structures such as tree structures and other hierarchical structures can be used advantageously within the scope of various embodiments. Octree structures can be beneficial for use for types of data such as point cloud data, whereas at least some types of volumetric data—such as primitives—may be advantageously stored in a bounding volume hierarchy (BVH) in at least some embodiments. BVHs can be beneficial for use with operations such as ray tracing and other similar situations, although changes in primitive position require a potential update of the tree. This can include at least updating from the node in question up to the root node, as well as the communication and other processing required thereafter. Additionally, BVHs may not provide an optimal uniform data structure for significantly different-sized contained objects. Larger objects often want to be separated out from small objects, but this desire does not solve the related rebuild issues. Depending at least in part on the implementation, inserting new primitives can also require making changes to nodes to rebalance the tree, which further increases the need for communication to, and compute operations performed by, listener processes or VMs, etc. The various modifications that need to be made corresponding to moving, scaling, or to perform any other update relating to various primitives can cause BVHs to be determined to be a sub-optimal choice for at least some embodiments.

Octrees may be poor in storing volumetric data in certain situations, but this characteristic appears primarily in situations such as ray tracing where iterating through the tree to get tight-fitting results is a key performance requirement. Given that approaches in accordance with various embodiments may predominantly store physical primitives that have a volume, there can only be so many primitives in a certain area. Combined with storing primitives at any node in the tree based on their size, such an approach should avoid issues with overwhelming a single node with too many primitives. As octree nodes are fixed in size, the nodes also do not suffer from small-scale motion issues of contained primitives, trading tight-fitting for reduced network and/or management compute costs. A tree update is only necessary in at least one embodiment if a primitive is created or destroyed, moved from one node in the tree to another, or otherwise experiences a significant change in its extents. The effect is also generally experienced with respect to the contents of the node rather than the hierarchy up through to the parent node. As such, octrees can better support distribution over multiple VMs than BVHs or similar structures in at least some embodiments.

An example to demonstrate benefits of such a process can use a one-dimensional case, starting with the region along the number line from [0, 1). The children would be given by [0, 0.5) and [0.5, 1). If the parent was grown positively to [0, 2), and its parent grown to [0, 4), everything would generally be acceptable until time to store the point −0.5. At that point, there would be a need to have a root that encompasses [−4, 4), and then recursively subdivide down to include the point −0.5. If the point 4.5 is included, the root [−4, 4) does not fit in at least one algorithm presented herein. It would then be necessary to discard this root and generate a new root of [−8, 8). Such an approach does not scale well as the size of the space grows. Pure-grid subdivision algorithms have numerous situations that suffer this issue along all the powers-of-two world boundaries, with an example poor case being across the middle of the space (or across the origin in boundless situations). If instead of growing in a single direction the process alternates in growth direction, as illustrated in FIGS. 2A-2D, then neighboring points will never encounter the crossing-a-power-of-two world-boundary-style octree issue. As mentioned, given any primitive an approach as presented herein can be used to compute the precise octree node to be used to store that primitive. The parents can be computed as needed to stitch that new node into an existing tree, and any point inside the child with a doubled axis_length_exponent can provide the parent AABB.

In at least one embodiment, nodes can be required to write their data to a fabric representation in order to allow for external traversal of the tree. An example process can use the numerical values of a bounding box minimum value corner of the octree node, as well as the axis length which represents the power-of-two exponent of the axis length of the same bounding box. To conform to USD naming requirements—using only A-Z, a-z, and 0-9 characters—without loss of precision, bitwise hexadecimal printing can be used, skipping trailing zeros for real numbers, as well as leading zeros for integral values. An example of a spatial database node name would be sdn_409aac_c0755_c09554_a, which represents a spatial database node whose min point is (−1707.0, −341.0, −1365.0) and whose axis length is 10.0.

In at least one embodiment, data can be aligned to a power of two boundary from the origin, and an octree can be grown in alternating directions. The octree can also grow from any point, and is not limited to starting at the origin. It might be the case where a simulation involves an automotive factory in Germany initially, but will eventually involve a full world simulation. There may eventually be many data centers processing the data for the entire planet, with one data center owning the data for the German automotive factor. In this instance, having the origin at the center of the world would not be optimal for that server, because all the distances would need to be very large relative to the origin, but the distances between points in the automotive factory are relatively small by comparison. It can be desirable to use a scale that is more friendly for simulating the automotive factor, particularly because smaller distances can allow for higher floating point accuracy in addition to potentially requiring less resource capacity to store and process. Further, if the octree is to grow in powers of two from the origin, going out to Germany from the center of the earth would end up with a cube that is twice as large as the distance to Germany. Each time a log(n) or other such search is to be performed, the query would have to pass down from that massive cube to get to the location of the factory. It would be more efficient (and practical), and require fewer resources or less resource capacity, to instead use an octree that corresponds primarily to the location of the factory, and is wrapped as tightly around the factory as possible.

Figure 3A:
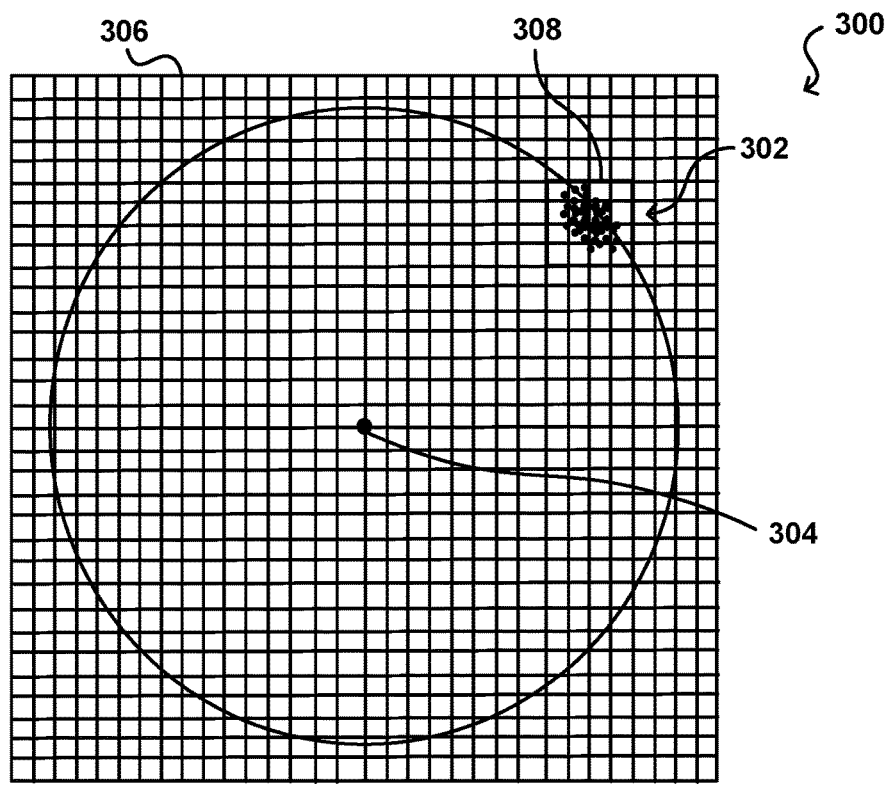
FIGS. 3A and 3B illustrate spatial tree representations that can be used to represent points in an environment, in accordance with various embodiments.

In such an embodiment, where the data is all relatively close together spatially but far from a potential origin point, it would be possible to use a subtree specific to that location, such as would correspond to a factory in a particular city on the globe. An approach that is based at a world origin point 304 is illustrated in the example representation 300 of FIG. 3A. In this example, there is a set of points 302 representative of a factory in one location on the globe. An octree representation 306 can be grown starting from the world origin point 304, and expanded at least until the bounded volume includes the set of points 302 as well as the origin. Since the points are on the surface of the globe and the world origin is at the center of the globe, the bounded volume 306, corresponding to the root node of the tree structure, would effectively bound the entire globe. As illustrated, only a small sub-tree 308 (or relatively small sub-volume) actually corresponds to the points of interest 302. In order to obtain that data in response to a query, however, the query would need to start at the top node and traverse the tree until arriving at the points of interest. As illustrated, this can be unnecessarily inefficient, occupying resource capacity that could be used for other tasks or operations.

Figure 3B:
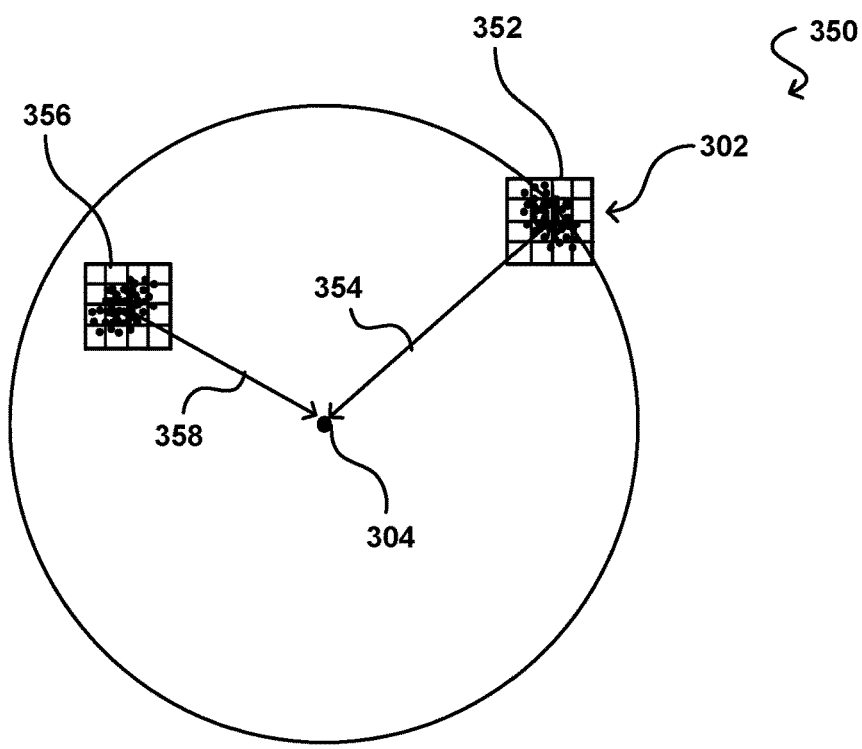

In at least one embodiment, a dedicated tree (or sub-tree) can be generated for a bounding volume 352 that corresponds only to these points 302, as illustrated in the example representation 350 of FIG. 3B. In at least one embodiment, a server (or virtual machine or compute instance, etc.) might be responsible for only this particular bounding volume 352 and the points contained therein, such that any queries for this bounded data can be served by this server using only the sub-tree for this bounded volume 352. It can be important, however, to maintain the position of these points in world space, such as where another set of points or primitives might be added for another object in world space, and it is desirable to know their relative position in the world or at least with respect to each other. In this example, an offset 354 can be determined and maintained between the world origin point 304 and a determined point of the bounded volume 352. While shown to correspond to a center point of the bounded volume 352, any selected point within or proximate to the volume can be used to maintain the offset 354 in various embodiments, at least to the extent that selected point is determinable for future processing. As illustrated, the bounded volume 352 specific to the points 302 is much smaller and contains many fewer levels of nodes, such that the corresponding tree can be traversed much more quickly. The data values relative to a local origin point can also be much smaller, allowing for less need for storage and/or higher precision.

As illustrated, it might be the case that a second factory is to be opened in a location that is far across the surface of the globe, such as in South Africa or Canada. Thus, there would be a second group of data points that is all relatively close together, but far from the world origin point 304 and far from the first group of data 302. Growing the octree from this world origin point to include both groups of data would result in a potentially extremely large octree to encompass these two relatively small regions corresponding to the groups of data, which can result in a large amount of inefficiency in terms of the multiple tests needed to go from a huge bounding box surrounding the world to the relatively small regions where the data resides. It can thus be advantageous to generate separate bounded volumes 352, 356 with separate octrees, or other sub-trees, for each set of points, and then maintaining relative offsets 354, 358 from the world origin point 304 to each bounded volume 352, 356. The offsets allow the location of any point in the environment to be determined both with respect to a local bounded volume and with respect to the world as a whole, as local points in a given octree (or other spatial database or data representation) can be defined or converted into world space coordinates. In systems where objects can be added at any location in the environment, including beyond the location of other objects, such an approach also allows additional sub-trees or bounding volumes to be added or determined relative to the world origin point 304 but without the need to grow a massive tree to bound all the objects as new objects are added or moved in the environment. Using a prior approach with a large, bounded region around all the points in the environment that is then sub-divided recursively into smaller bounded regions, can result in a large number of layers to traverse, which can make the corresponding spatial database unpractical to traverse in certain situations.

In at least some embodiments, objects may not correspond to stationary or static objects such as factories, but may correspond to people, characters, vehicles, or other objects that can move, or otherwise change position and/or orientation, in the world. In many instances, the objects will remain within a bounded volume, and the primitives will remain within the same nodes of the octree. It might be the case that some of the primitives move between different bounded sub-volumes, such that the corresponding data is to be moved to different nodes of the tree structure. In some cases, however, the primitives may pass outside a current bounded volume, such that it may be necessary to grow or modify the existing bounded volume, which may also involve growing (or shrinking) the corresponding octree. As presented herein, approaches in accordance with at least one embodiment attempt to grow the smallest possible bounded volume, such as the smallest bounding cube that includes all the relevant points or primitive, and does not have extra space or layers around it. Such an approach can also attempt to use a minimum number of layers through which a process will have to recurse to find the data relevant for a particular query, resulting in higher efficiency and less required resource capacity, which can improve the performance of a computer system performing the query. Because these bounded volumes are determined to bound the data as tightly as possible, slight variations in primitive locations may cause those locations to fall outside the bounded volume. Variations may also lead to the presence of empty nodes in the tree that no longer store any data but may need to be traversed in some embodiments. Rebuilding spatial databases such as octrees, however, can be very time consuming and computationally expensive.

In at least one embodiment, an attempt can be made to reduce the size of a bounded region and/or spatial database where possible, in order to further improve efficiency and reduce resource capacity requirements. In one example, an object in the environment may be deleted, or at least moved out of a bounded sub-volume where there are no other objects. In at least one embodiment, any node of an octree that is determined to not store or include any primitive or other data for an environment can be removed from the tree. Further, any node that does not have any child nodes in the tree that include primitives or data can also be removed, moving up the tree until all leaf nodes contain data for the environment in at least one embodiment. In this way, nodes that may not have previously been leaf nodes may become leaf nodes as a result of pruning the tree based on object movement or removal, etc. Such pruning may be performed automatically for movement of various objects, or may be performed periodically to reduce the amount of additional processing to be used for pruning. In some embodiments, one or more thresholds or criteria might be set to trigger pruning, such that small movements that only impact one or two leaf nodes of a large tree may not trigger a pruning operation, but a change that impacts at least a minimum number of nodes might be sufficient to trigger a pruning. Similarly, thresholds might be put in place to generate new layers or nodes, or to increase the size of the bounded volume, based upon additions or changes in the locations of objects in the environment. One primitive passing slightly outside a bounded volume may not be sufficient to generate an entire new volume, particularly where that data is not currently being used for processing (e.g., within the frustum of a virtual camera used to render a view of the virtual environment). An object added completely outside the bounded volume, however, may trigger the growth of a new bounded volume starting from the newly added object, as discussed herein, that should then result in the minimum size bounding volume for all relevant points in the environment. In at least one embodiment, the root can change as objects move or change, and can be allowed to constantly change (within any restrictions on change frequency, etc.) to be able to provide the minimum wrapping root node that encompasses all the relevant data.

Figure 4:
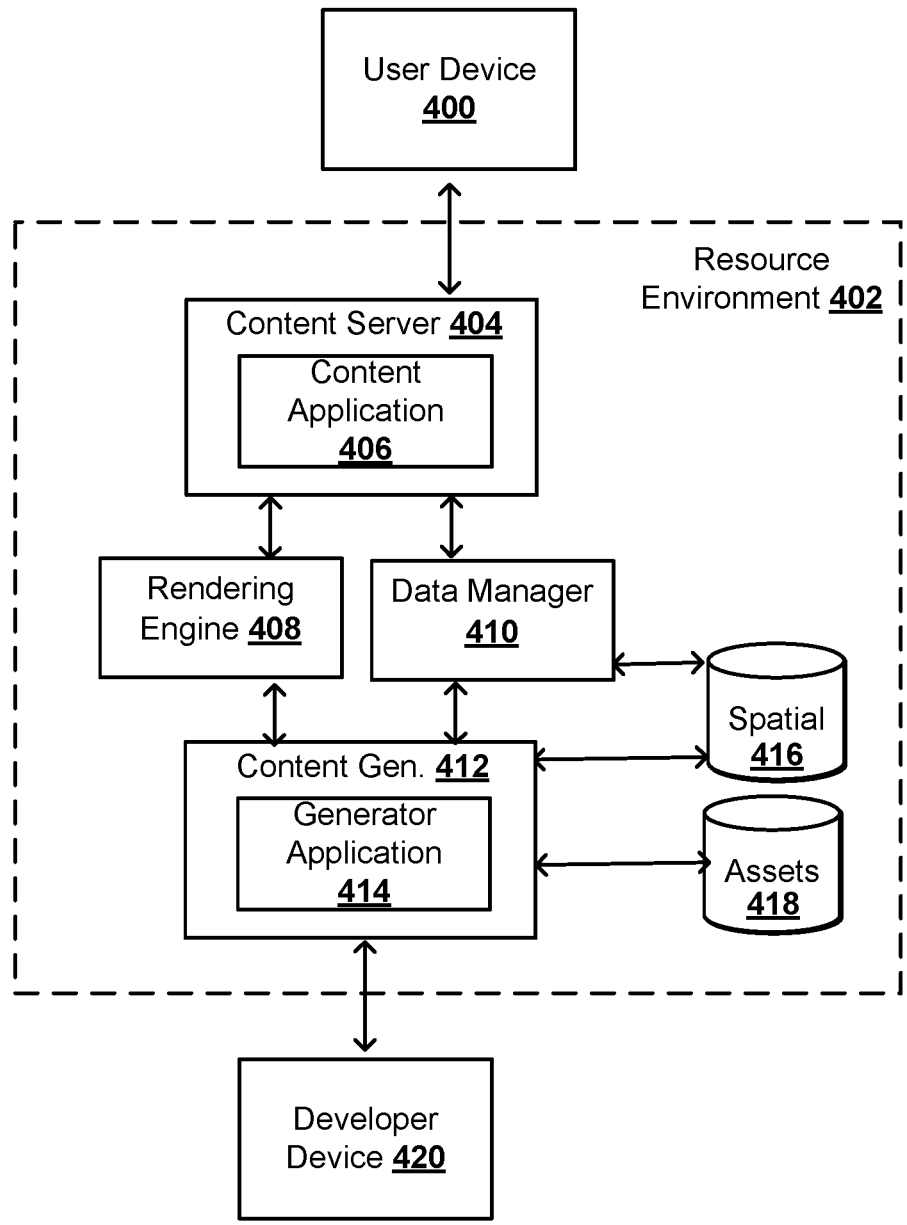
FIG. 4 illustrates an example system for querying a spatial database for use in content generation, in accordance with various embodiments.

The ability to store data, such as object primitives, to a spatial database allows for the querying of that data for various uses or operations. FIG. 4 illustrates an example system that can be used for such purposes in accordance with at least one embodiment. In this example, a resource environment 402 is illustrated which can provide various physical or virtual resources for use by various users for various purposes, such as may be part of a multi-tenant resource or "cloud" environment. In an example use case, a user such as a developer can use a developer device 420, such as a desktop computer or workstation, to place selected virtual objects into a virtual environment, as well as to manipulate those objects within that environment. Such tasks can be used as part of a content generation system, such as may generate image or video data as part of a content presentation offering. This may include generating image, video, media, or other such presentable content for use with animation, a video game, a heads-up display, a virtual reality (VR)/augmented reality (AR)/enhanced reality (ER) experience, a multiverse/metaverse/omniverse experience, and the like. In this example the developer device might access a generator application 414 executing on a content generation server 412, for example, to place and modify objects in a virtual environment. The developer may create or upload these objects using the developer device, or select these objects from an asset repository 418, among other such options. In this example, the content generator application will cause data—such as geometric primitives for these objects—to be stored to a spatial database 416. The content generator may store this data directly to the spatial database 416, or may work with a data manager 410 that is able to update the spatial database 416 as appropriate. This can include, as discussed herein, modifying the bounded volumes in the environment, or modifying the spatial database structure itself to correspond to any changes in the environment. The data manager 410 can perform other tasks as well, such as to periodically attempt to optimize the spatial database through pruning or other such tasks. The developer can also indicate how these objects should, or are able to, move through or behave in the environment over time.

A user can then use a user device 400 in this example to access content generated by a content application 406 running on a content server 404 in the resource environment. This may include obtaining content for presentation via the user device 400 that is rendered by a rendering engine 408 using data from the asset repository 418 and position information from the spatial database 416. In order to determine the content to be rendered, the rendering engine (or content application 406) can contact the data manager 410 to query the spatial database (although in other embodiments the querying can be done directly without involving a data manager). The query can be performed against the spatial databased to determine the relevant data, such as may correspond to objects intersected by a ray of a ray tracing process. The primitive data for intersected objects can be returned as a response to the query, enabling the rendering engine to render content having the appropriate view to be provided to the user device. As the developer, user, or content application 406 modify the objects in the environment, the data manager 410 can re-evaluate the spatial database to determine if any modification is warranted or beneficial, such as where the changes at least satisfy one or more change thresholds or criteria.

Figure 5A:
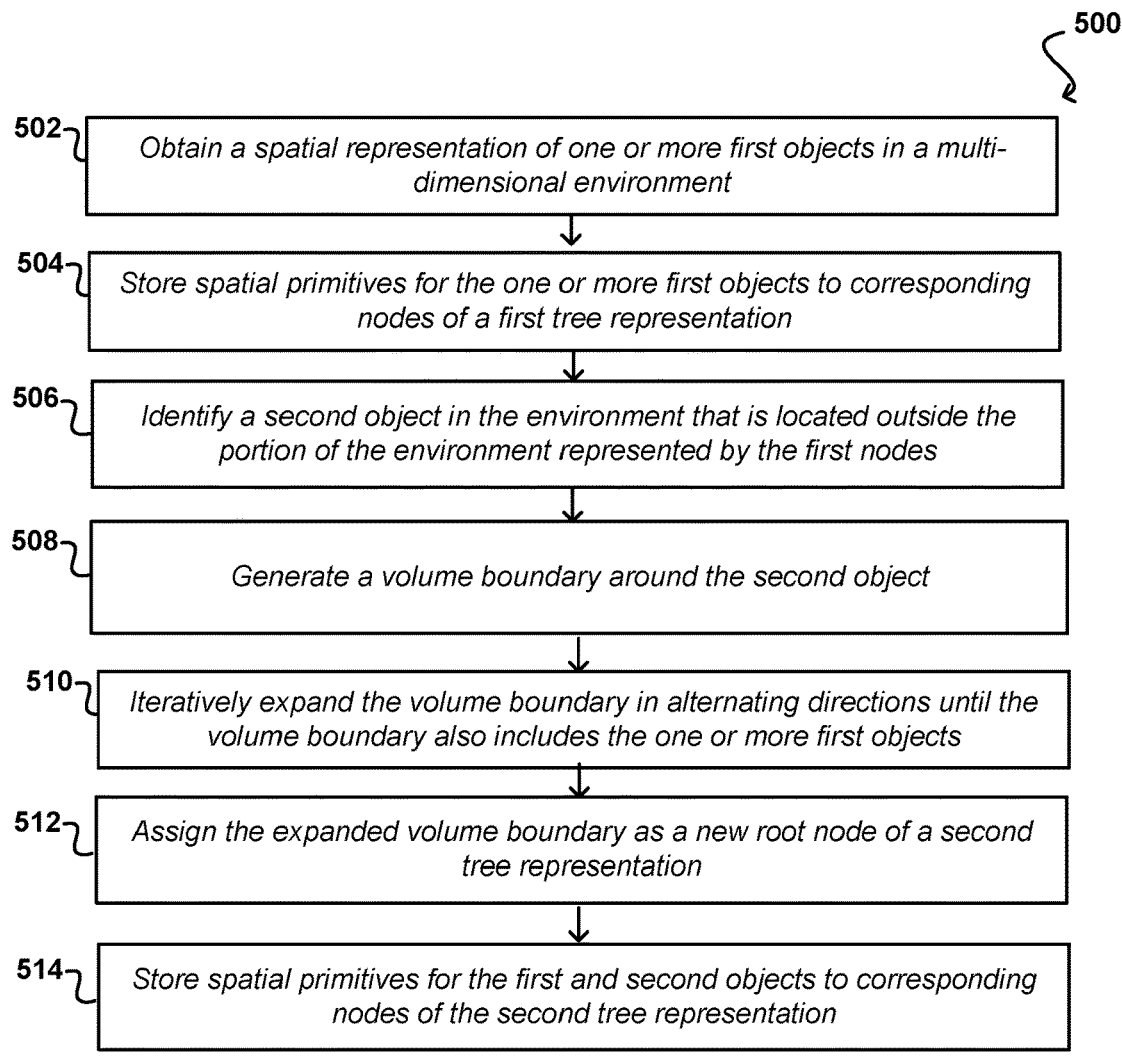
FIGS. 5A and 5B illustrate portions of an example process for representing objects in a spatial database and then querying that database to obtain relevant data, in accordance with various embodiments.
Figure 5B:
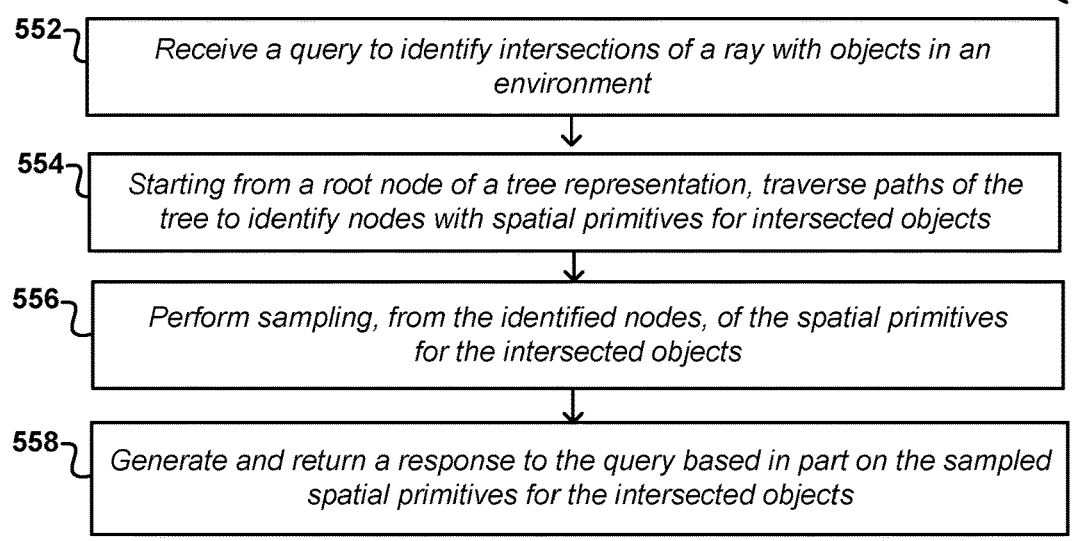

FIGS. 5A and 5B illustrate example processes that can be performed using such a system to store data to a spatial database and retrieve data from that database, respectively, that can be performed in accordance with at least one embodiment. It should be understood that for this and other processes presented herein that there may be additional, fewer, or alternative steps performed or similar or alternative orders, or at least partially in parallel, within the scope of the various embodiments unless otherwise specifically stated. Further, although this example is described with respect to primitives and octrees, it should be understood that other types of data and spatial databases can be used as well within the scope of various embodiments. In the example process 500 of FIG. 5A, a spatial database—such as an octree—is obtained 502 that includes data for one or more first objects in a multi-dimensional environment. Spatial primitives for these objects can be stored 504 to corresponding nodes of a first tree representation of this spatial database. As mentioned, the first tree representation may be modified over time based in part upon movement of those objects or changes in position of the primitives. In this example, a second object is identified 506 in the environment that is outside the portion of the environment represented by the first nodes of the first tree representation. This may result from the second object being added to the environment or moved into a specific location of the environment, among other such options. In order to cause spatial primitives (or other relevant data) to be stored to the spatial database, a volume boundary can be generated 508 around the second object. This second volume boundary can be iteratively expanded 510 in alternating directions until the volume boundary also includes the one or more first objects. The expanded volume boundary can then be assigned 512 to correspond to the new root node of a new or updated spatial database for this environment. The primitives for the first and second objects can then be stored 514 to the corresponding nodes of this second spatial database or tree representation. Such an approach can be implemented to attempt to minimize the height of an octree, or other spatial database, around an arbitrary data set in a generic environment relative to an origin point. In at least one embodiment, growth can be aligned to a power of two boundary from the origin, with the octree being grown in at least two alternating directions.

FIG. 5B illustrates an example process 550 for querying a spatial database, such as may be created using a process such as that illustrated in FIG. 5A, that can be performed in accordance with various embodiments. In this example, a query is received 552 to identify intersections of a ray with one or more objects in an environment, where that query may be generated as part of a ray tracing or rendering process. Starting from a root node of a tree representation of a spatial database, the paths of the tree representation can be traversed 554 to identify one or more nodes with spatial primitives for one or more objects intersected by the ray. Sampling of the identified spatial primitives for the intercepted objects can be performed 556 from the identified nodes of the tree representation. A response to the query can be generated 558 and returned based in part upon the sampled spatial primitives for the intersected objects. This data may then be used to render or otherwise generate image, video, or other media content for presentation via at least one presentation device, among other such uses.

As discussed, aspects of various approaches presented herein can be lightweight enough to execute on a device such as a client device, as may include a personal computer or gaming console, in real time. Such processing can be performed on, or for, content that is generated on, or received by, that client device or received from an external source, such as streaming data or other content received over at least one network from a cloud server 620 or third party service 660, among other such options. In some instances, at least a portion of the processing, generation, and/or determination of this content may be performed by one of these other devices, systems, or entities, then provided to the client device (or another such recipient) for presentation or another such use.

Figure 6:
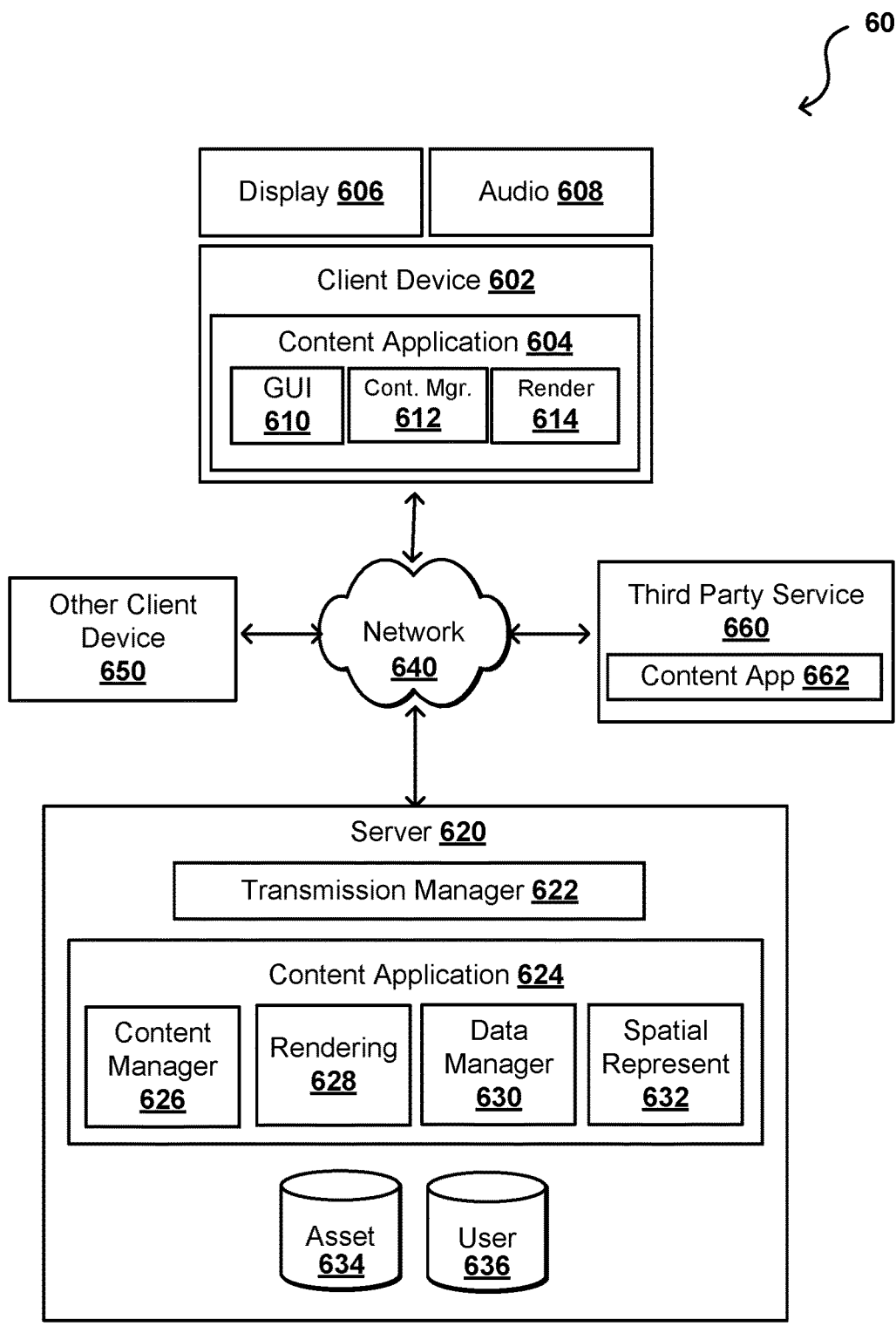
FIG. 6 illustrates components of a distributed system that can be used to store and retrieve content data from a spatial database, according to at least one embodiment.

As an example, FIG. 6 illustrates an example networked system configuration 600 that can be used to provide, generate, modify, encode, process, and/or transmit image data or other such content. In at least one embodiment, a client device 602 can generate or receive data for a session using components of a content application 604 on client device 602 and data stored locally on that client device 602. In at least one embodiment, a content application 624 executing on a server 620 (e.g., a cloud server or edge server) may initiate a session associated with at least one client device 602, as may use a session manager and user data stored in a user database 636, and can cause content such as one or more digital assets (e.g., object representations) from an asset repository 634 to be determined by a content manager 626. A content manager 626 may work with a rendering module 628 to generate or select objects, digital assets, or other such content to be placed in a virtual environment and allowed to move or act within that environment. Views of these objects can be rendered by the rendering module 628 and provided for presentation via the client device 602. In at least one embodiment, this rendering module 628 can query object primitives stored to a spatial database. A data manager 630 can be responsible for generating, maintaining, and updating the spatial database, either directly or in combination with a spatial representation module 632 that can continually update and attempt to optimize the spatial database. When content is to be generated by the rendering module 628, the rendering module can cause a query to be submitted against the spatial database, as may be stored in memory by the spatial representation module 632 or storage connected thereto, and can receive back response data that can be used to render the content. At least a portion of the rendered (or otherwise generated or selected) content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding content application 604, which may also or alternatively include a graphical user interface 610, content manager 612, and rendering module 614 for use in providing, synthesizing, modifying, or using content for presentation (or other purposes) on or by the client device 602. In such an embodiment, the client device 602 may issue queries against the spatial database stored by the server 620 (or in another accessible location). A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
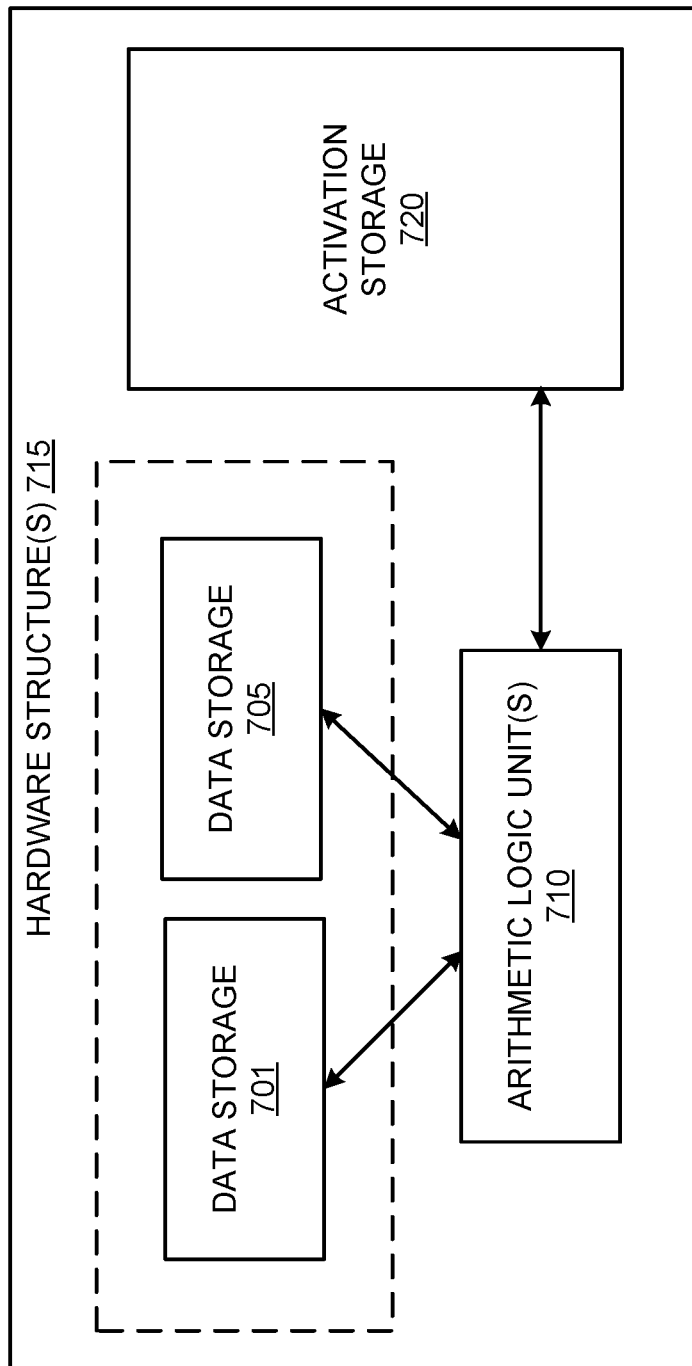
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 701 and/or code and/or data storage 705 are used as operands along with other values, such as bias values, gradient information, momentum values, or other parameters or hyperparameters, any or all of which may be stored in code and/or data storage 701 or code and/or data storage 705 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
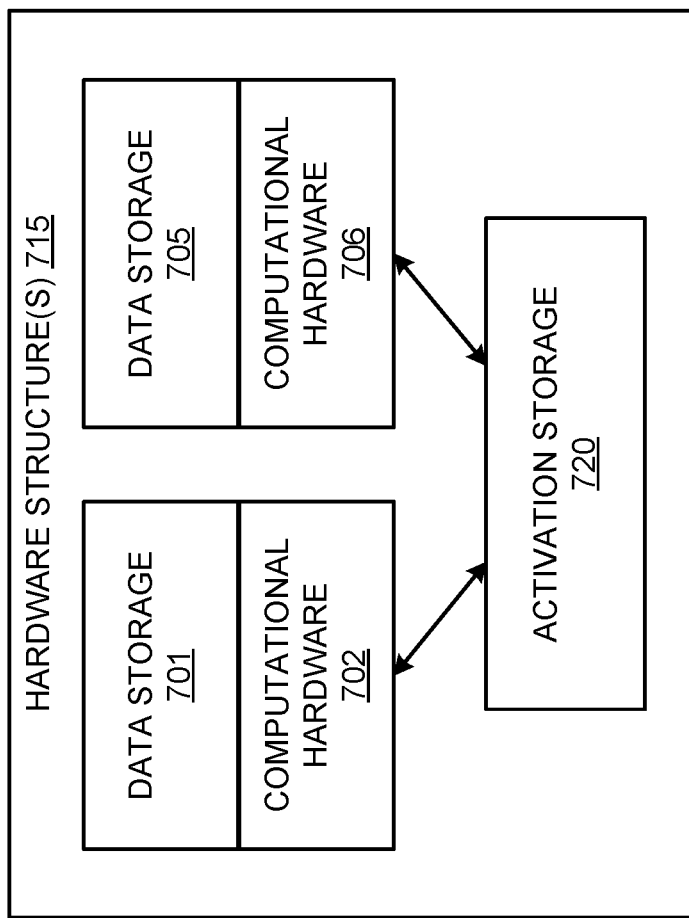
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
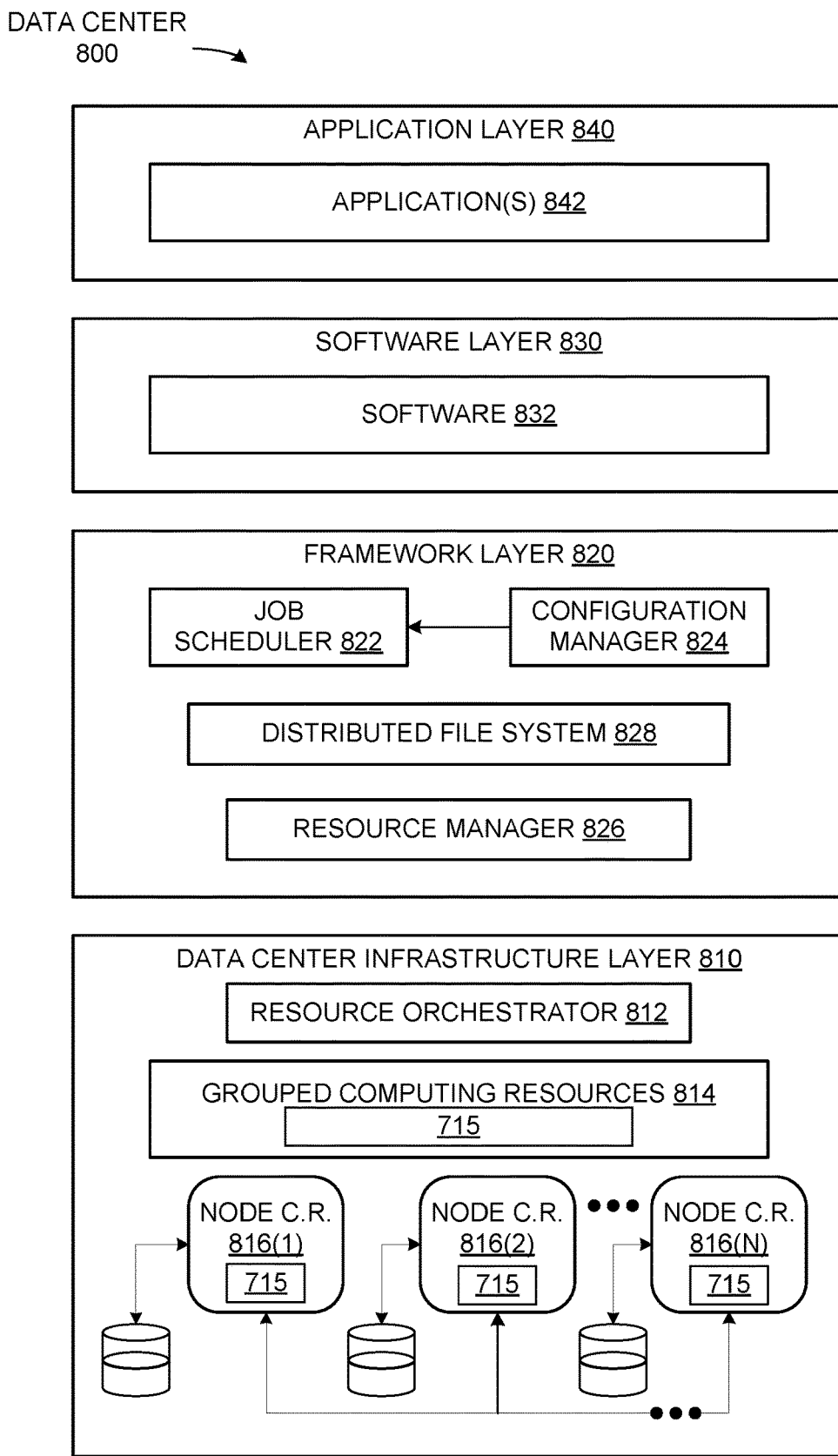
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to generate and maintain a minimally-sized octree (or other spatial representation) for an arbitrary and/or dynamic dataset.

Computer Systems

Figure 9:
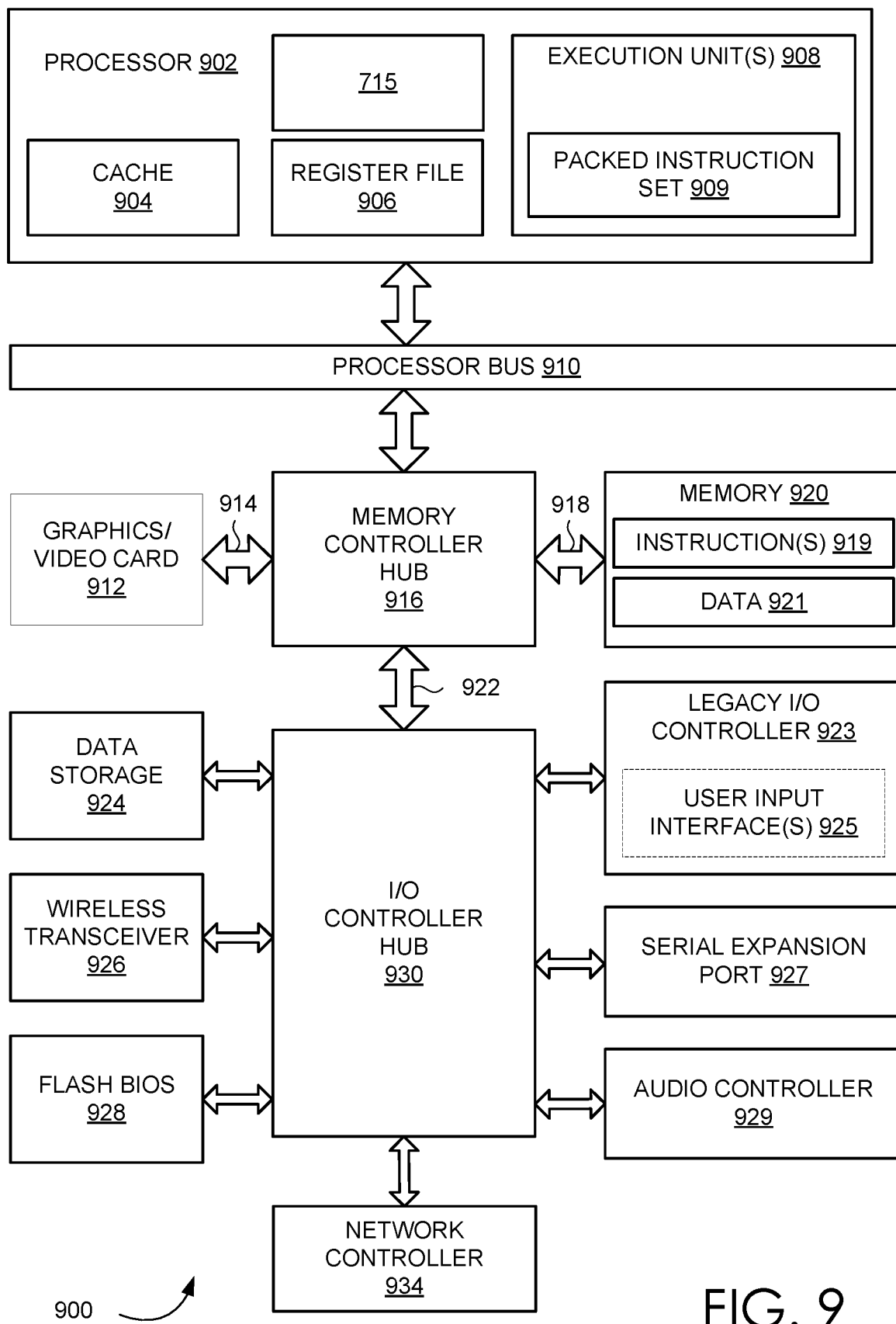
FIG. 9 illustrates a computer system, according to at least one embodiment.

FIG. 9 is a block diagram illustrating an exemplary computer system 900, which may be a system with interconnected devices and components, a system-on-a-chip (SOC) or some combination thereof formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution unit(s) 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word computing ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache 904 may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit(s) 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit(s) 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor data bus 910 for performing operations on packed data, which may eliminate need to transfer smaller units of data across processor data bus 910 to perform one or more operations one data element at a time.

In at least one embodiment, execution unit(s) 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interface(s) 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to generate and maintain a minimally-sized octree (or other spatial representation) for an arbitrary and/or dynamic dataset.

Figure 10:
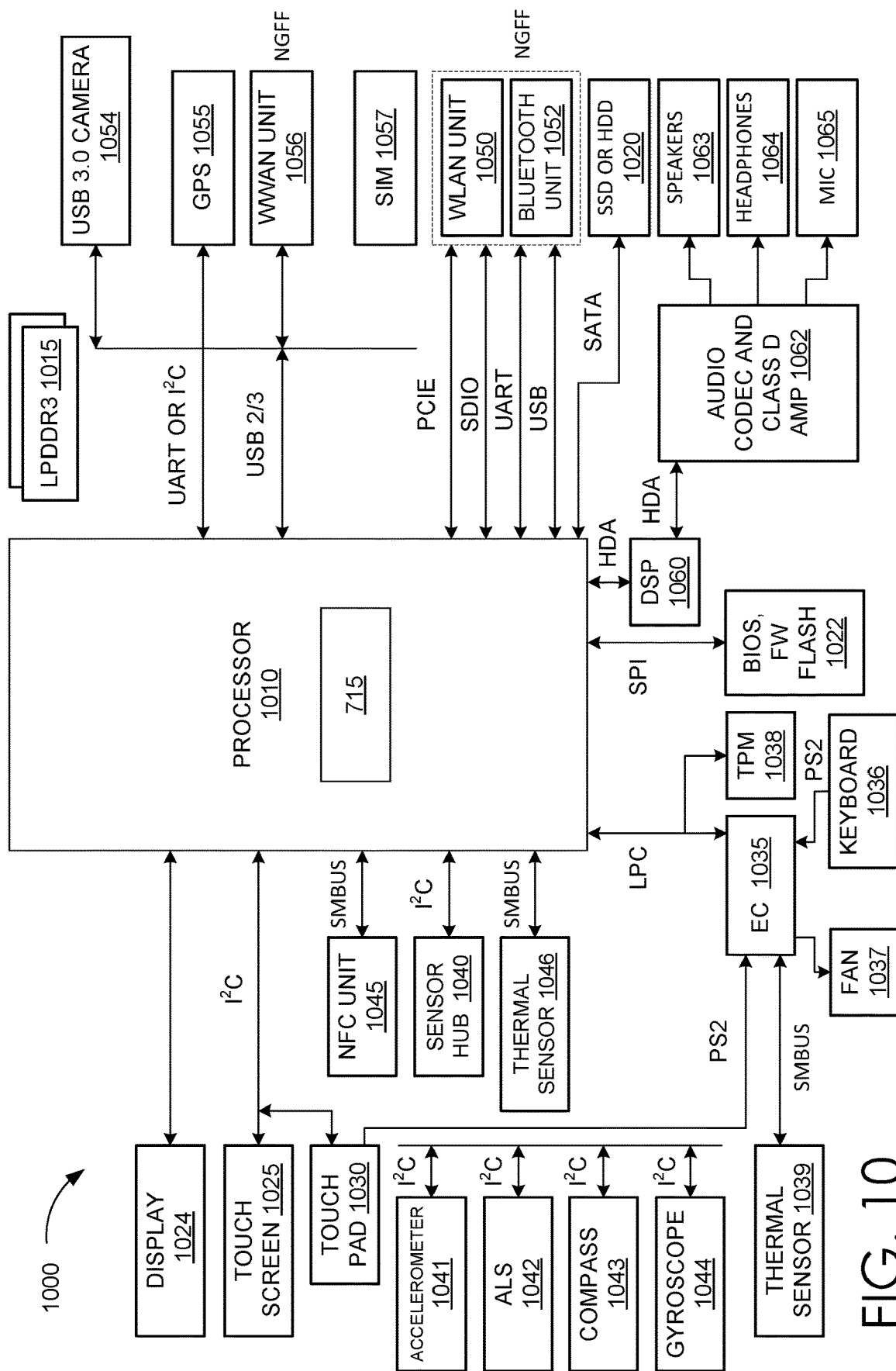
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates an electronic device 1000, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1043, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to generate and maintain a minimally-sized octree (or other spatial representation) for an arbitrary and/or dynamic dataset.

Figure 11:
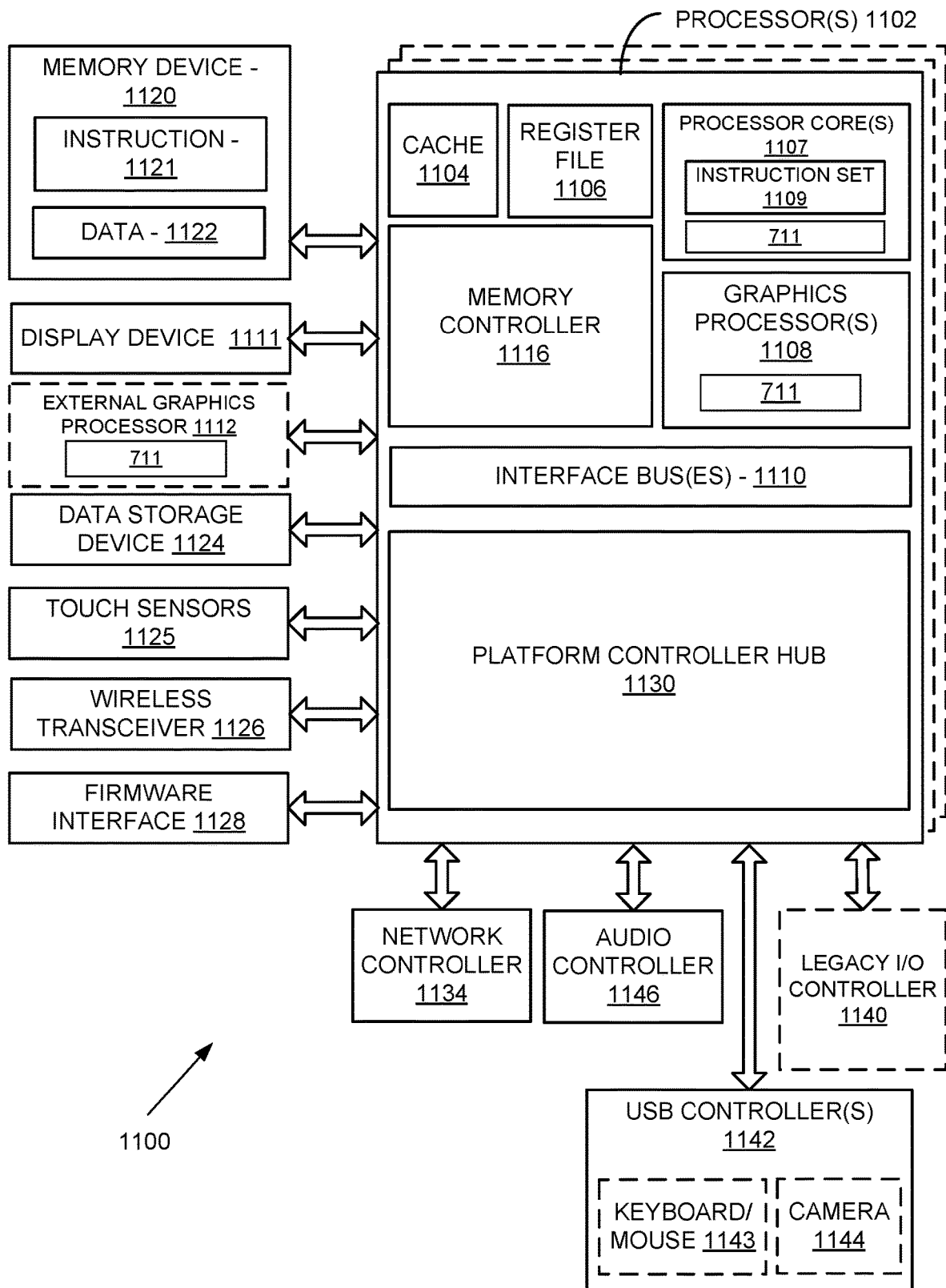
FIG. 11 illustrates at least portions of a graphics processor, according to one or more embodiments.

FIG. 11 is a block diagram of a processing system, according to at least one embodiment. In at least one embodiment, processing system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, processing system 1100 is a processing platform incorporated within a system-on-a-chip (SoC) integrated circuit for use in mobile, handheld, or embedded devices.

In at least one embodiment, processing system 1100 can include, or be incorporated within a server-based gaming platform, a game console, including a game and media console, a mobile gaming console, a handheld game console, or an online game console. In at least one embodiment, processing system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, augmented reality device, or virtual reality device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory ("cache") 1104. In at least one embodiment, processor(s) 1102 can have a single internal cache or multiple levels of internal cache. In at least one embodiment, cache 1104 is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in processing system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses (e.g., PCI, PCI Express), memory buses, or other types of interface buses. In at least one embodiment processor(s) 1102 include an integrated memory controller 1116 and a platform controller hub 1130. In at least one embodiment, memory controller 1116 facilitates communication between a memory device 1120 and other components of processing system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for processing system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 allows peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 allows communication with system firmware, and can be, for example, a unified extensible firmware interface (UEFI). In at least one embodiment, network controller 1134 can allow a network connection to a wired network. In at least one embodiment, a high-performance network controller (not shown) couples with interface bus(es) 1110. In at least one embodiment, audio controller 1146 is a multi-channel high definition audio controller. In at least one embodiment, processing system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, processing system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processing system 1100. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to generate and maintain a minimally-sized octree (or other spatial representation) for an arbitrary and/or dynamic dataset.

Figure 12:
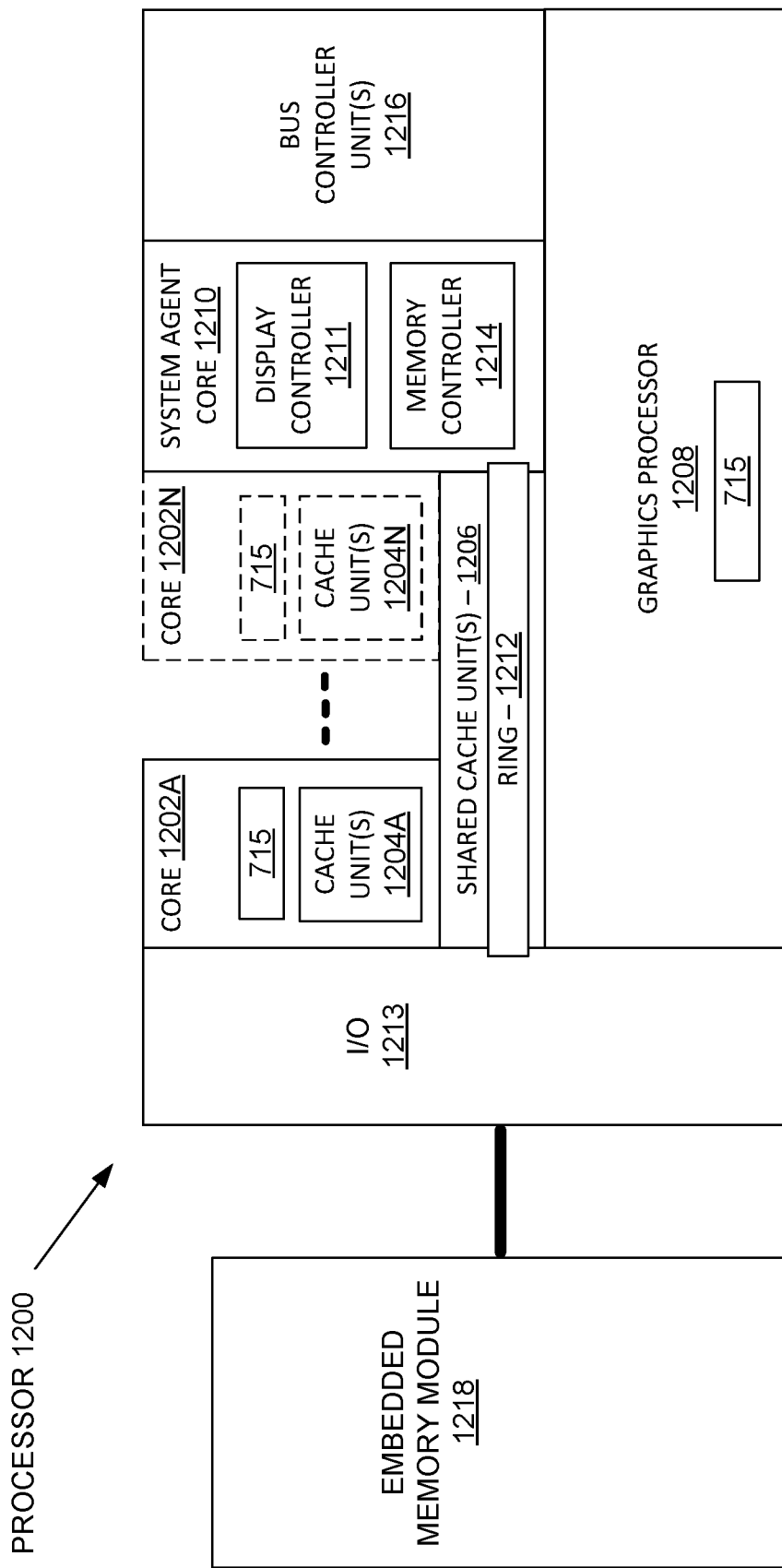
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core(s) 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache memory unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express buses. In at least one embodiment, system agent core 1210 provides management functionality for various processor components. In at least one embodiment, system agent core 1210 includes one or more integrated memory controller(s) 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controller(s) 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory module 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to generate and maintain a minimally-sized octree (or other spatial representation) for an arbitrary and/or dynamic dataset.

Virtualized Computing Platform

Figure 13:
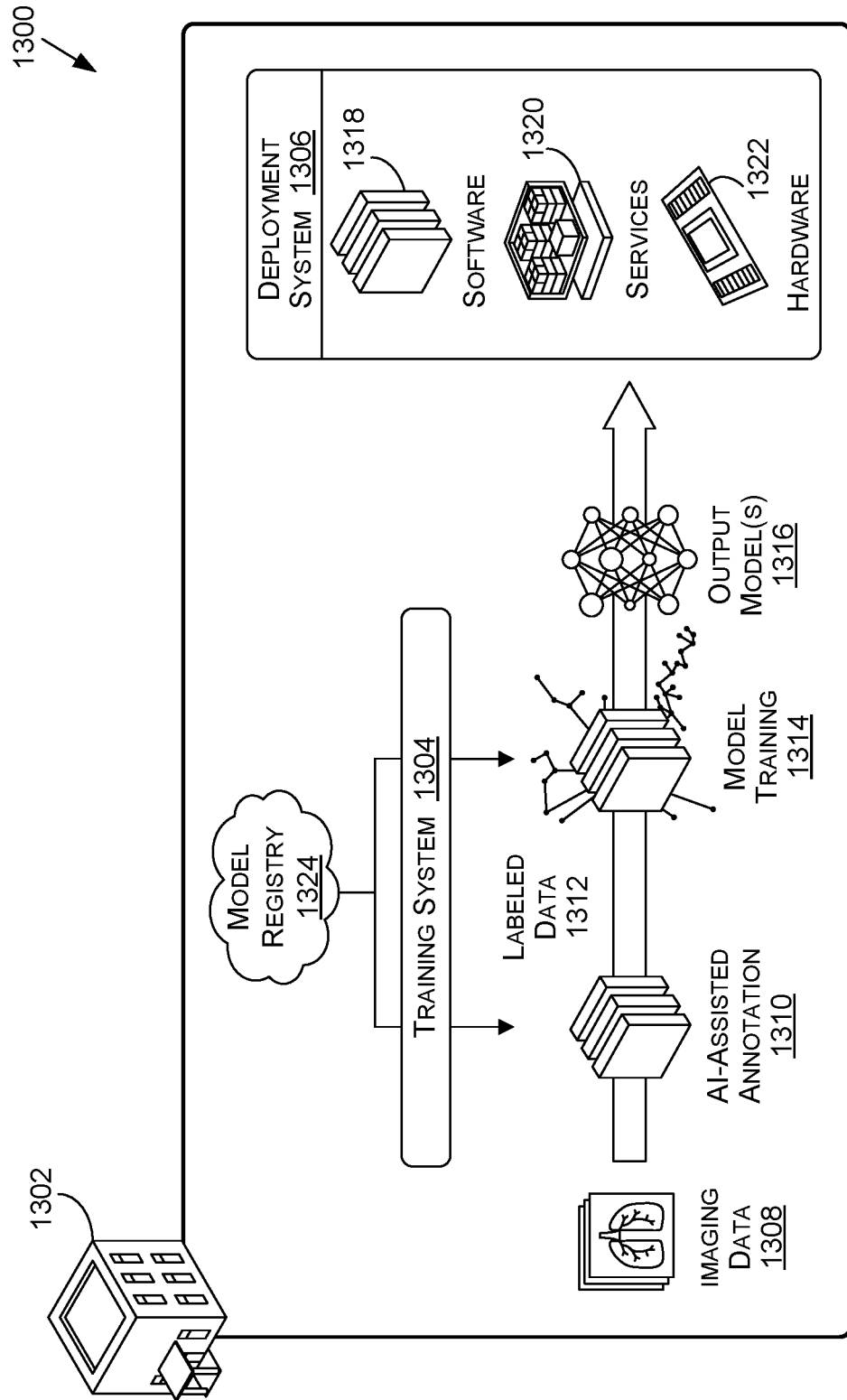
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facility (ies) 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility (ies) 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility (ies) 1302 using data 1308 (such as imaging data) generated at facility (ies) 1302 (and stored on one or more picture archiving and communication system (PACS) servers at facility (ies) 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1304 may include a scenario where facility (ies) 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, training system 1304 may include a scenario where facility (ies) 1302 needs a machine learning model for use in performing one or more processing tasks for one or more applications in deployment system 1306, but facility (ies) 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility(ies) 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility(ies) 1302 requiring a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility(ies) 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility (ies) 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., processor 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by process 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., process 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform). In at least one embodiment, rather than each application that shares a same functionality offered by services 1320 being required to have a respective instance of services 1320, services 1320 may be shared between and among various applications. In at least one embodiment, services 1320 may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a services 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility (ies) 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to allow seamless scaling and load balancing.

Figure 14:
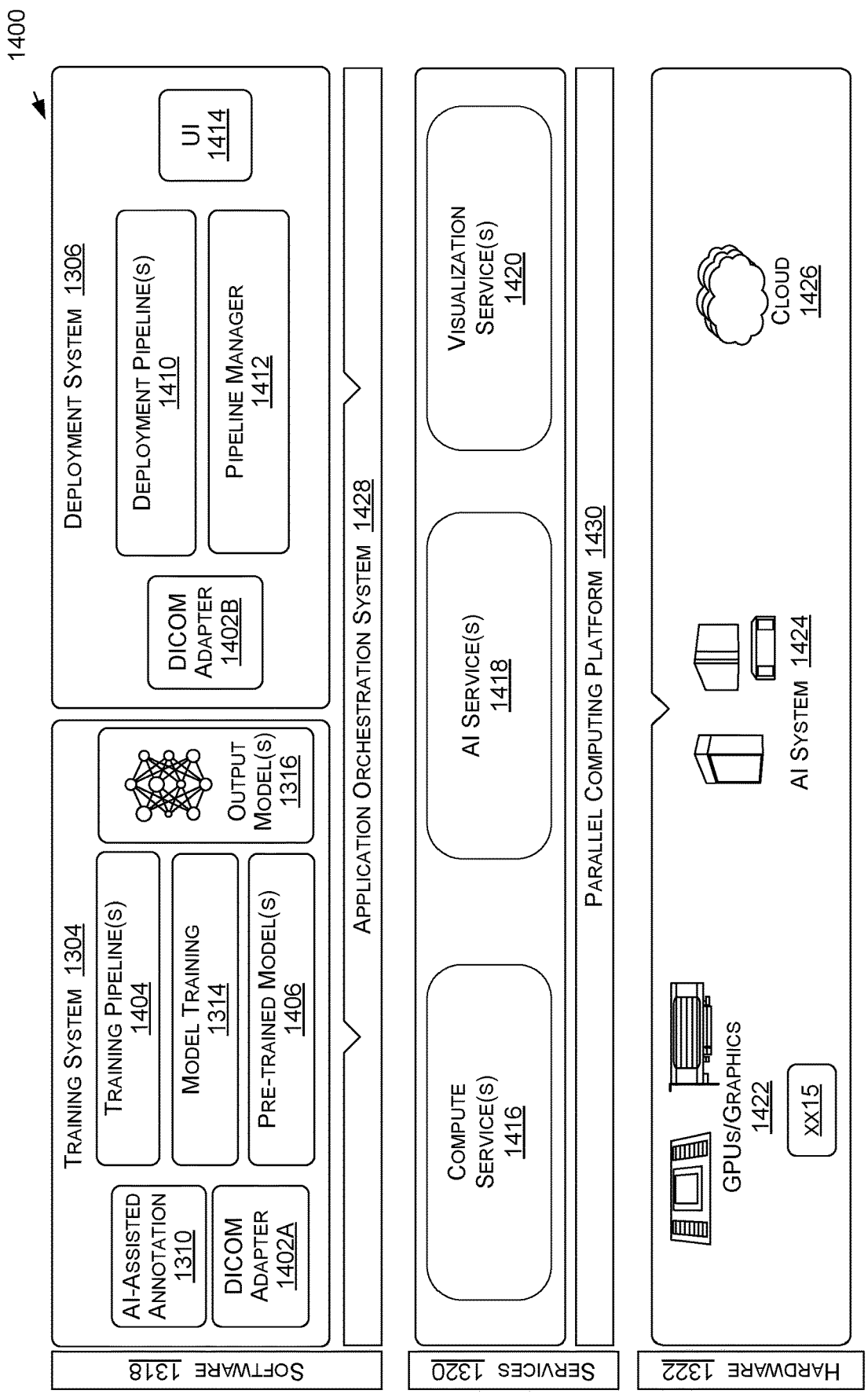
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus (ses), wireless data protocols (Wi-Fi), wired data protocols (e.g., Ethernet), etc.

In at least one embodiment, training system 1304 may execute training pipeline(s) 1404, similar to those described herein with respect to FIG. 13. In at least one embodiment, where one or more machine learning models are to be used in deployment pipeline(s) 1410 by deployment system 1306, training pipeline(s) 1404 may be used to train or retrain one or more (e.g. pre-trained) models, and/or implement one or more of pre-trained model(s) 1406 (e.g., without a need for retraining or updating). In at least one embodiment, as a result of training pipeline(s) 1404, output model(s) 1316 may be generated. In at least one embodiment, training pipeline(s) 1404 may include any number of processing steps, such as but not limited to imaging data (or other input data) conversion or adaption In at least one embodiment, for different machine learning models used by deployment system 1306, different training pipeline(s) 1404 may be used. In at least one embodiment, training pipeline(s) 1404 similar to a first example described with respect to FIG. 13 may be used for a first machine learning model, training pipeline(s) 1404 similar to a second example described with respect to FIG. 13 may be used for a second machine learning model, and training pipeline(s) 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipeline(s) 1404 may include AI-assisted annotation, as described in more detail herein with respect to at least FIG. 14. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation 1310 may be performed as part of deployment pipelines 1410; either in addition to, or in lieu of AI-assisted annotation 1310 included in training pipeline(s) 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility(ies) 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (e.g., a virtual ultrasound instrument, a virtual CT scan instrument, a virtual sequencing instrument, etc.).

In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples, pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may allow general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/Graphics 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to allow seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
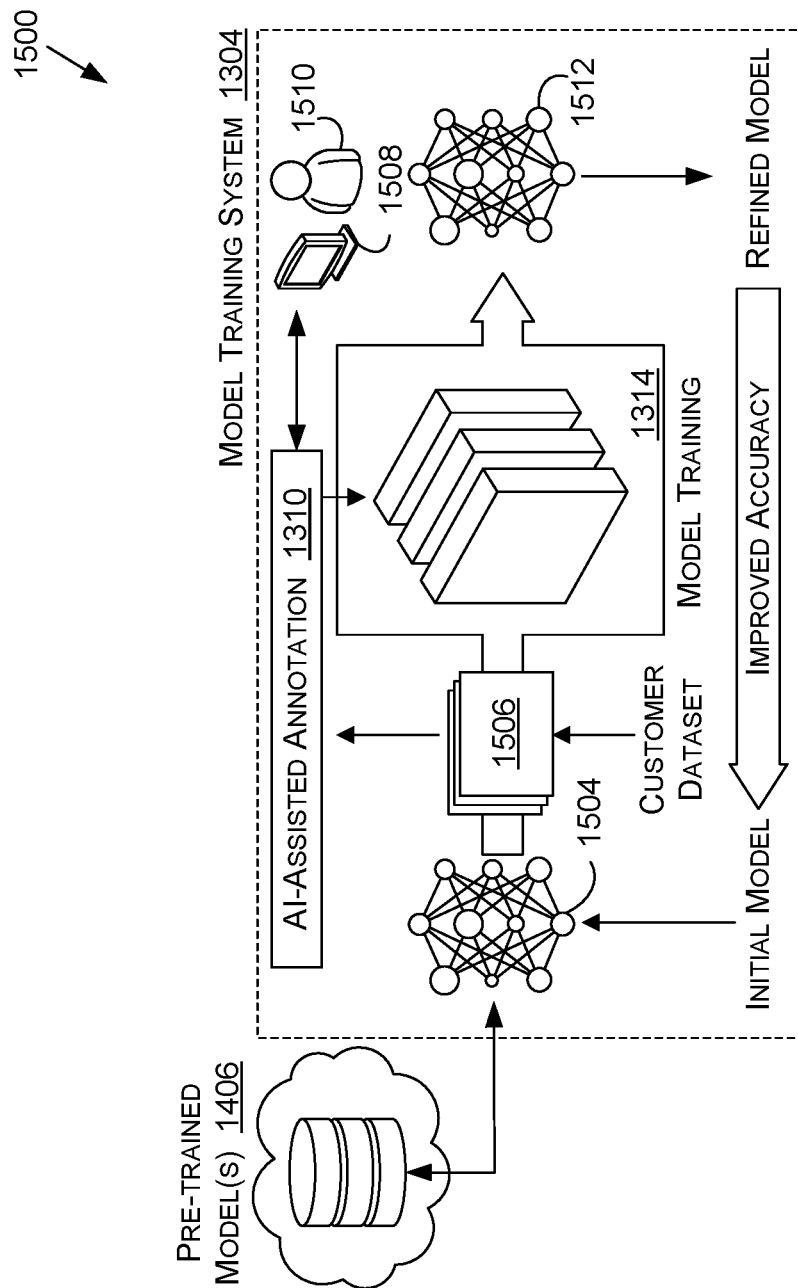
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined model 1512 generated by process 1500 may be executed by a deployment system for one or more containerized applications in deployment pipelines 1510.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained model(s) 1506 may be stored in a data store, or registry. In at least one embodiment, pre-trained model(s) 1506 may have been trained, at least in part, at one or more facilities other than a facility executing process 1500. In at least one embodiment, to protect privacy and rights of patients, subjects, or clients of different facilities, pre-trained model(s) 1506 may have been trained, on-premise, using customer or patient data generated on-premise. In at least one embodiment, pre-trained model(s) 1506 may be trained using a cloud and/or other hardware, but confidential, privacy protected patient data may not be transferred to, used by, or accessible to any components of a cloud (or other off premise hardware). In at least one embodiment, where pre-trained model(s) 1506 is trained at using patient data from more than one facility, pre-trained model(s) 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model(s) 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select pre-trained model(s) 1506 to use with an application. In at least one embodiment, pre-trained model(s) 1506 may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model(s) 1506 may be updated, retrained, and/or fine-tuned for use at a respective facility.

In at least one embodiment, a user may select pre-trained model(s) 1506 that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by model training system 1304. In at least one embodiment, ground truth data may be generated, at least in part, by clinicians, scientists, doctors, practitioners, at a facility.

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, this process may be completed at any number of facilities such that refined model 1512 may be further refined on new datasets any number of times to generate a more universal model.

Figure 15B:
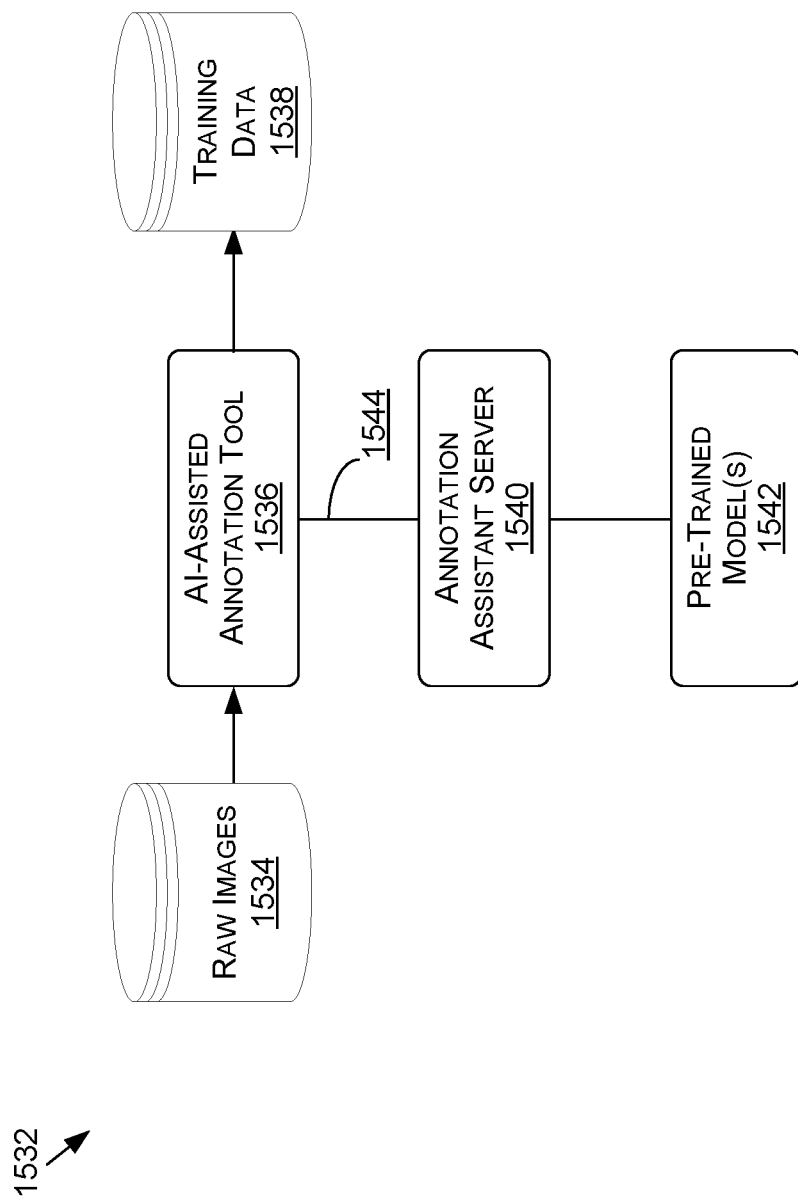

FIG. 15B is an example illustration of a client-server architecture 1532 to enhance annotation tools with pre-trained annotation model(s) 1542, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an annotation assistant server 1540 that may include a set of pre-trained model(s) 1542 stored in an annotation model registry, for example. In at least one embodiment, an annotation model registry may store pre-trained model(s) 1542 (e.g., machine learning models, such as deep learning models) that are pre-trained to perform AI-assisted annotation 1310 on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
   obtaining a first spatial representation of one or more first objects in an environment, spatial primitives for the one or more first objects being stored to first nodes of the first spatial representation;
   identifying a second object in the environment that is located outside the portion of the environment represented by the first spatial tree representation;
   generating a volume boundary around the second object;
   iteratively expanding the volume boundary in alternating directions until the volume boundary for the second object includes the second object and the one or more first objects; and
   using the volume boundary, after the expanding, to define a new root node of a second spatial representation storing spatial primitives for the one or more first objects and the second object in the environment.

2. The computer-implemented method of clause 1, further comprising:
   receiving a query relating to a view of the environment from a location of a virtual camera;
   traversing the second spatial representation to determine one or more nodes storing primitives for objects at least partially contained within the view; and
   sampling, from among the determined nodes, the primitives corresponding to the view.

3. The computer-implemented method of clause 1, further comprising:
   storing an offset value for the first spatial representation from an origin point in a world space in which the environment is located.

4. The computer-implemented method of clause 3, further comprising:
   updating the offset value to correspond to a root location of the new root node of the second spatial representation.

5. The computer-implemented method of clause 3, further comprising:
   assigning different portions of the world space to different virtual machines to store and manage spatial primitives for the different portions, wherein the different virtual machines store respective offset values for respective spatial representations of objects in the different portions with respect to the origin point in the world space.

6. The computer-implemented method of clause 1, wherein the spatial representation is an octree, k-dimensional tree (kd-tree), or bounded volume hierarchy (BVH).
7. The computer-implemented method of clause 1, further comprising:
determining that at least one object, of the one or more first objects and the second object, is removed from the environment; and
iteratively deleting nodes of the second spatial representation until a third spatial representation is obtained that includes only nodes storing spatial primitives for remaining objects in the environment.
8. The computer-implemented method of clause 1, further comprising:
updating the second spatial representation in response to determining that one or more changes in the environment satisfy at least one update criterion, the update criterion including at least a creation or destruction of a primitive, a movement of a primitive between spatial representations, or at least a threshold change in size of volume to be bounded.
9. The computer-implemented method of clause 1, further comprising:
monitoring the second spatial representation to determine whether the second spatial representation is to be updated to remain a minimally-sized representation for a current state of objects in the environment.
10. A processor, comprising:
one or more circuits to:
  obtain a first octree representation for one or more first objects in an environment, spatial primitives for the one or more first objects stored to first nodes of a first octree representation;
  identify a second object in the environment that is located outside the portion of the environment represented by the first octree tree representation;
  generate a volume boundary around the second object;
  iteratively expand the volume boundary in alternating directions until the volume boundary for the second object includes the one or more first objects and the second object; and
  use the expanded volume boundary to define a new root node of a second octree representation storing spatial primitives for the one or more first objects and the second object in the environment.
11. The processor of clause 10, wherein the one or more circuits are further to:
receive a query relating to a view of the environment from a location of a virtual camera;
traverse the second octree representation to determine one or more nodes storing primitives for objects at least partially contained within the view; and
sample, from among the determined nodes, the primitives corresponding to the view.
12. The processor of clause 10, wherein the one or more circuits are further to:
store an offset value for the first octree representation from an origin point in a world space in which the environment is located; and
update the offset value to correspond to a root location of the new root node of the second octree representation.
13. The processor of clause 10, wherein the one or more circuits are further to:
determine that at least one object, of the one or more first objects and the second object, is removed from the environment; and
iteratively delete nodes of the second spatial representation until a third octree representation is obtained that includes only nodes storing spatial primitives for remaining objects in the environment.
14. The processor of clause 10, wherein the processor is comprised in at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.
15. A system, comprising:
one or more processors to iteratively expand, in alternating directions, a bounding volume for a new object in a virtual environment until the bounding volume includes the new object and one or more previously-existing objects in the dynamic environment, wherein the bounding volume becomes a root node for a tree representation of a portion of the dynamic environment including the new object and the one or more previously-existing objects.
16. The system of clause 15, wherein data for the one or more previously-existing objects was stored to a prior tree representation, and wherein the bounding volume is expanded until the bounding volume includes a portion of the virtual environment represented by the prior tree representation.
17. The system of clause 15, wherein the tree representation stores spatial primitives for the new object and the one or more previously-existing objects.
18. The system of clause 15, wherein the one or more processors are further to iteratively delete one or more nodes from the tree representation upon determination of removal of at least one object from the virtual environment until a reduced tree representation is obtained that contains only a portion of the virtual environment that includes spatial primitives for one or more remaining objects in the virtual environment.
19. The system of clause 15, wherein the tree representation is an octree, k-dimensional tree (kd-tree), or bounded volume hierarchy (BVH).
20. The system of clause 15, wherein the system comprises at least one of:
a system for performing simulation operations;
a system for performing simulation operations to test or validate autonomous machine applications;
a system for performing digital twin operations;
a system for performing light transport simulation;
a system for rendering graphical output;

a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   obtaining a first spatial representation of one or more first objects in an environment, spatial primitives for the one or more first objects being stored using first nodes of the first spatial representation;
   identifying a second object in the environment that is located outside a portion of the environment represented by the first spatial representation;
   generating a volume boundary around the second object;
   iteratively expanding the volume boundary in alternating directions until the volume boundary for the second object includes the second object and the one or more first objects; and
   using the volume boundary, after the expanding, to define a new root node of a second spatial representation storing spatial primitives for the one or more first objects and the second object in the environment.

2. The computer-implemented method of claim 1, further comprising:
   receiving a query relating to a view of the environment from a location of a virtual camera;
   traversing the second spatial representation to determine one or more nodes storing primitives for objects at least partially contained within the view; and
   sampling, from among the determined nodes, the primitives corresponding to the view.

3. The computer-implemented method of claim 1, further comprising:
   storing an offset value for the first spatial representation from an origin point in a world space in which the environment is located.

4. The computer-implemented method of claim 3, further comprising:
   updating the offset value to correspond to a root location of the new root node of the second spatial representation.

5. The computer-implemented method of claim 3, further comprising:
   assigning different portions of the world space to different virtual machines to store and manage spatial primitives for the different portions, wherein the different virtual machines store respective offset values for respective spatial representations of objects in the different portions with respect to the origin point in the world space.

6. The computer-implemented method of claim 1, wherein the spatial representation is an octree, k-dimensional tree (kd-tree), or bounded volume hierarchy (BVH).

7. The computer-implemented method of claim 1, further comprising:
   determining that at least one object, of the one or more first objects and the second object, is removed from the environment; and
   iteratively deleting nodes of the second spatial representation until a third spatial representation is obtained that includes only nodes storing spatial primitives for remaining objects in the environment.

8. The computer-implemented method of claim 1, further comprising:
updating the second spatial representation in response to determining that one or more changes in the environment satisfy at least one update criterion, the update criterion including at least one of: a creation or destruction of a primitive, a movement of a primitive between spatial representations, or at least a threshold change in size of volume to be bounded.

9. The computer-implemented method of claim 1, further comprising:
monitoring the second spatial representation to determine whether the second spatial representation is to be updated to remain a minimally-sized representation for a current state of objects in the environment.

10. A processor, comprising:
one or more circuits to:
obtain a first octree representation for one or more first objects in an environment, spatial primitives for the one or more first objects being stored using first nodes of a first octree representation;
identify a second object in the environment that is located outside a portion of the environment represented by the first octree representation;
generate a volume boundary around the second object;
iteratively expand the volume boundary in alternating directions until the volume boundary for the second object includes the one or more first objects and the second object; and
use the expanded volume boundary to define a new root node of a second octree representation storing spatial primitives for the one or more first objects and the second object in the environment.

11. The processor of claim 10, wherein the one or more circuits are further to:
receive a query relating to a view of the environment from a location of a virtual camera;
traverse the second octree representation to determine one or more nodes storing primitives for objects at least partially contained within the view; and
sample, from among the determined nodes, the primitives corresponding to the view.

12. The processor of claim 10, wherein the one or more circuits are further to:
store an offset value for the first octree representation from an origin point in a world space in which the environment is located; and
update the offset value to correspond to a root location of the new root node of the second octree representation.

13. The processor of claim 10, wherein the one or more circuits are further to:
determine that at least one object, of the one or more first objects and the second object, is removed from the environment; and
iteratively delete nodes of the second spatial representation until a third octree representation is obtained that includes only nodes storing spatial primitives for remaining objects in the environment.

14. The processor of claim 10, wherein the processor is comprised in at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;

a system implemented using an edge device;
a system for performing operations using one or more language models;
a system for performing generative AI operations;
a system for generating or presenting virtual reality (VR) content;
a system for generating or presenting augmented reality (AR) content;
a system for generating or presenting mixed reality (MR) content;
a system incorporating one or more Virtual Machines (VMs); a system implemented at least partially in a data center; a system for performing hardware testing using simulation;
a system for synthetic data generation; a collaborative content creation platform for 3D assets; or
a system implemented at least partially using cloud computing resources.

15. A system, comprising:
one or more processors to iteratively expand, in alternating directions, a bounding volume for a new object in a virtual environment until the bounding volume includes the new object and one or more previously-existing objects in the virtual environment, wherein the bounding volume becomes a root node for a tree representation of a portion of the virtual environment including the new object and the one or more previously-existing objects.

16. The system of claim 15, wherein data for the one or more previously-existing objects was stored using a prior tree representation, and wherein the bounding volume is expanded until the bounding volume includes a portion of the virtual environment represented by the prior tree representation.

17. The system of claim 15, wherein the tree representation stores spatial primitives for the new object and the one or more previously-existing objects.

18. The system of claim 15, wherein the one or more processors are further to iteratively delete one or more nodes from the tree representation, upon determination of a removal of at least one object from the virtual environment, until a reduced tree representation is obtained that contains only a portion of the virtual environment that includes spatial primitives for one or more remaining objects in the virtual environment.

19. The system of claim 15, wherein the tree representation is an octree, k-dimensional tree (kd-tree), or bounded volume hierarchy (BVH).

20. The system of claim 15, wherein the system comprises at least one of:
a system for performing simulation operations;
a system for performing simulation operations to test or validate autonomous machine applications;
a system for performing digital twin operations;
a system for performing light transport simulation;
a system for rendering graphical output;
a system for performing operations using one or more language models;
a system for performing generative AI operations;
a system for performing deep learning operations;
a system implemented using an edge device;
a system for generating or presenting virtual reality (VR) content;
a system for generating or presenting augmented reality (AR) content;
a system for generating or presenting mixed reality (MR) content;

a system incorporating one or more Virtual Machines (VMs);
a system implemented at least partially in a data center;
a system for performing hardware testing using simulation;
a system for synthetic data generation; a collaborative content creation platform for 3D assets; or
a system implemented at least partially using cloud computing resources.

* * * * *